(12) United States Patent
Minnette et al.

(10) Patent No.: US 10,246,209 B2
(45) Date of Patent: *Apr. 2, 2019

(54) CONTAINER

(71) Applicant: Berry Plastics Corporation, Evansville, IN (US)

(72) Inventors: Jeffrey C. Minnette, Evansville, IN (US); Philip A. Driskill, Newburgh, IN (US); David D. Sun, Evansville, IN (US); Rolland Strasser, Asbury, NJ (US); Birju A. Surti, Ronks, PA (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/938,352

(22) Filed: Mar. 28, 2018

(65) Prior Publication Data
US 2018/0215493 A1    Aug. 2, 2018

Related U.S. Application Data

(63) Continuation of application No. 15/383,115, filed on Dec. 19, 2016, which is a continuation of application No. 14/787,901, filed as application No. PCT/US2014/027551 on Mar. 14, 2014, now Pat. No. 9,725,202.

(60) Provisional application No. 61/783,994, filed on Mar. 14, 2013.

(51) Int. Cl.
| | |
|---|---|
| *B65D 1/02* | (2006.01) |
| *B32B 1/02* | (2006.01) |
| *B32B 27/06* | (2006.01) |
| *B32B 27/32* | (2006.01) |

(52) U.S. Cl.
CPC .............. *B65D 1/0215* (2013.01); *B32B 1/02* (2013.01); *B32B 27/065* (2013.01); *B32B 27/32* (2013.01); *B32B 2266/025* (2013.01); *B32B 2307/304* (2013.01); *B32B 2307/72* (2013.01); *B32B 2439/00* (2013.01)

(58) Field of Classification Search
CPC ..... B65D 1/0215; B32B 1/02; B32B 2439/00; B32B 2307/72; B32B 2307/304; B32B 2266/025; B32B 27/32; B32B 27/065
See application file for complete search history.

(56) References Cited

U.S. PATENT DOCUMENTS

| | | |
|---|---|---|
| 9,102,461 B2 | 8/2015 | Leser |
| 9,758,293 B2 | 9/2017 | Leser |

OTHER PUBLICATIONS

Unilever Says It Will Use Less Plastic Per Bottle, Yahoo News (Apr. 22, 2014, 10:20 AM), http://news.yahoo.com/unilever-says-less-plastic-per-bottle-142039401-finance.html (3 pages).
Chinese Office Action for Application Serial No. 201480021009.9, dated Aug. 7, 2017 including English language summary, 12 pages.
Chinese Office Action for Chinese App. No. 201480047976.2 dated Aug. 11, 2017, 15 pages.

(Continued)

*Primary Examiner* — Michael C Miggins
(74) *Attorney, Agent, or Firm* — Barnes & Thornburg LLP

(57) ABSTRACT

A vessel is configured to hold a product in an interior region formed in the vessel. In illustrative embodiments, the vessel includes a floor and a sidewall coupled to the floor to extend away from the floor. Together the floor and sidewall cooperate to define the interior region.

20 Claims, 17 Drawing Sheets

(56) References Cited

OTHER PUBLICATIONS

Dongwu Yang, Plastic Material Selection Technology, Light Industry Press, Jan. 2008, 1 page.
Australian First Patent Examination Report for Australian App. No. 2014311991 dated Oct. 4, 2017, 4 pages.
Office Action dated Oct. 3, 2017 for U.S. Appl. No. 15/491,443; (pp. 1-6).
Office Action dated Oct. 6, 2017 for U.S. Appl. No. 15/383,115; (pp. 1-5).
Office Action dated Oct. 27, 2017 for U.S. Appl. No. 15/239,894; (pp. 1-7).
Chinese Office Action for Application Serial No. 201480021009.9, dated Jan. 2, 2018 including English language summary, 6 pages.
Office Action dated Jan. 17, 2018 for U.S. Appl. No. 15/591,355; (pp. 1-5).
Chinese Office Action for Application Serial No. 201480021009.9, dated Apr. 20, 2018 including English language summary, 6 pages.
Chinese Office Action for Chinese App. No. 20180039581.8 dated Feb. 23, 2018, 13 pages.
Chinese Final Rejection for Chinese App. No. 201480047976.2 dated Mar. 7, 2018, 8 pages.
Chinese Office Action for Chinese App. No. 201480047978.1 dated Feb. 24, 2018, 11 pages.
Chinese Office Action for Chinese App. No. 20180042446.9 dated Feb. 3, 2018, 9 pages.
Chinese Office Action for Chinese App. No. 201480047578.0 dated Jan. 24, 2018, 10 pages.
Vasile et al., Practical Guide to Polyethylene, published by Smithers Rapra Press, 2008, p. 119, 3 pages.
Office Action dated Apr. 27, 2018 for U.S. Appl. No. 15/061,005 (pp. 1-7).
Office Action dated Apr. 16, 2018 for U.S. Appl. No. 15/061,070, (pp. 1-13).
Definition of "Base," Dictionary.com, available at http://www.dictionary.com/browse/base, retrieved on Apr. 16, 2018.
Office Action dated Apr. 20, 2018 for U.S. Appl. No. 15/239,894, (pp. 1-13).
Office Action dated Jun. 15, 2018 for U.S. Appl. No. 15/491,443, pp. 1-6.
Lubrizol Advanced Materials, Inc., Extrusion Guide, 2014, 16 pages.
Chinese Office Action for Chinese App. No. 201480047578.0 dated Aug. 29, 2018, 4 pages.
Office Action dated Sep. 7, 2018 for U.S. Appl. No. 15/239,894, (pp. 1-9).
Chinese Office Action for Chinese App. No. 20180042446.9 dated Oct. 31, 2018, 5 pages.
Office Action dated Dec. 6, 2018 for U.S. Appl. No. 15/388,319, (pp. 1-10).
Office Action dated Dec. 13, 2018 for U.S. Appl. No. 15/672,668, (pp. 1-13).
Substantive Examination Report for European App. No. 17182869.2 dated Nov. 12, 2018, 5 pages.
Canadian office action for Canadian App. No. 2842325 dated Oct. 26, 2018, 4 pages.
Office Action dated Jan. 14, 2019 for U.S. Appl. No. 15/004,263, (pp. 1-15).

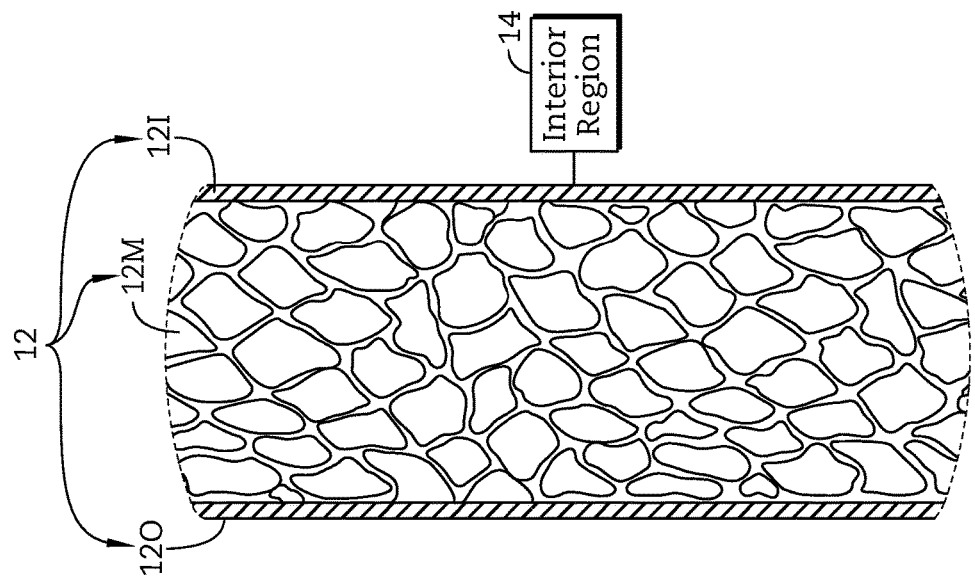
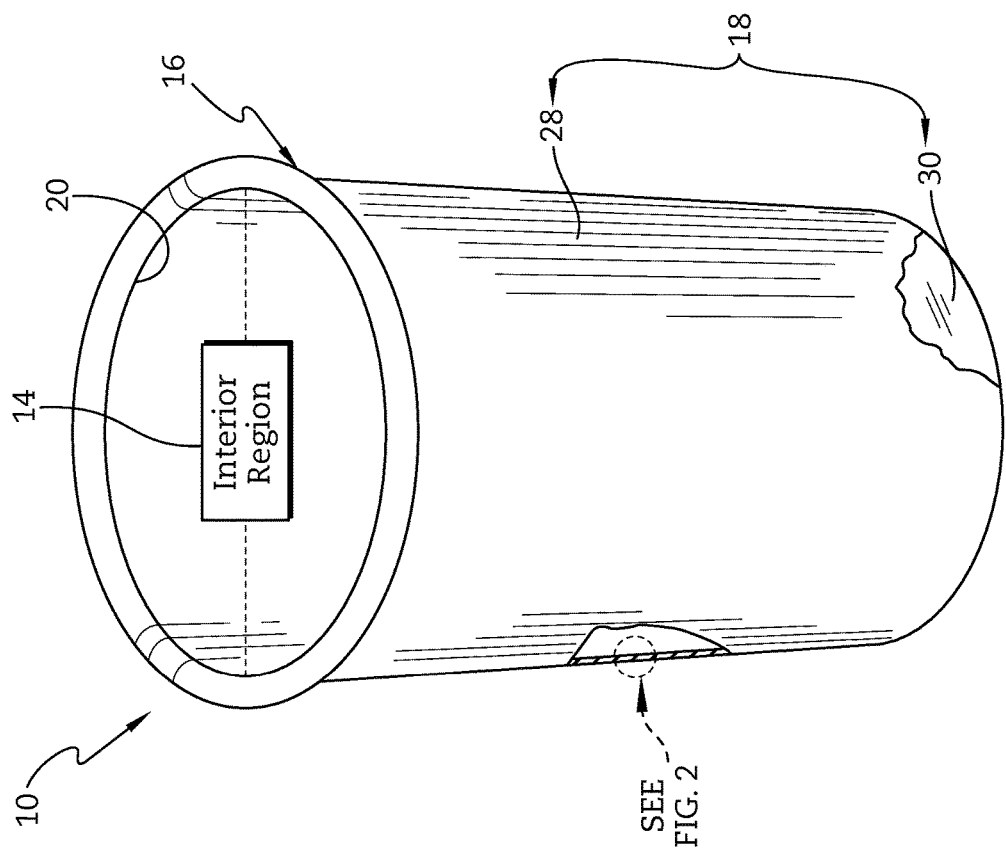

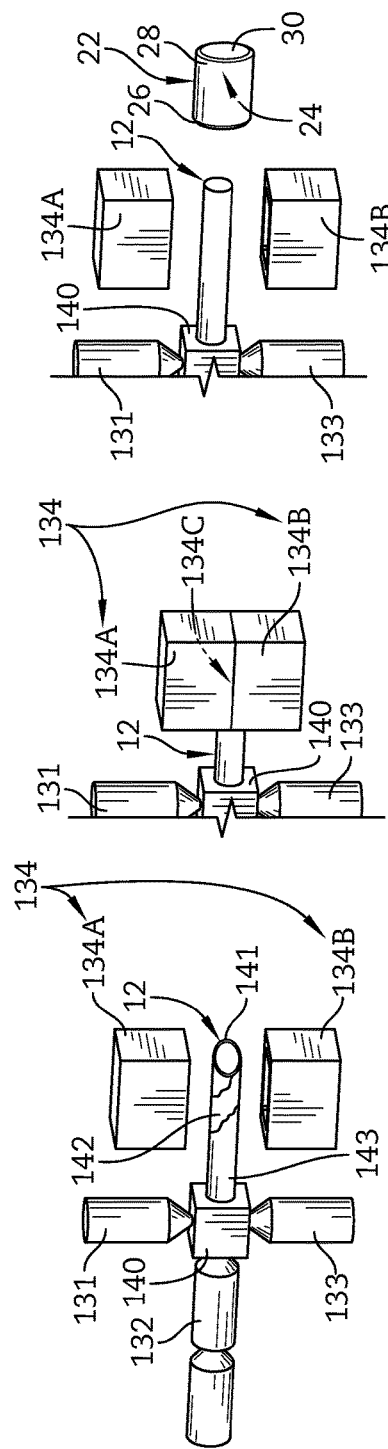
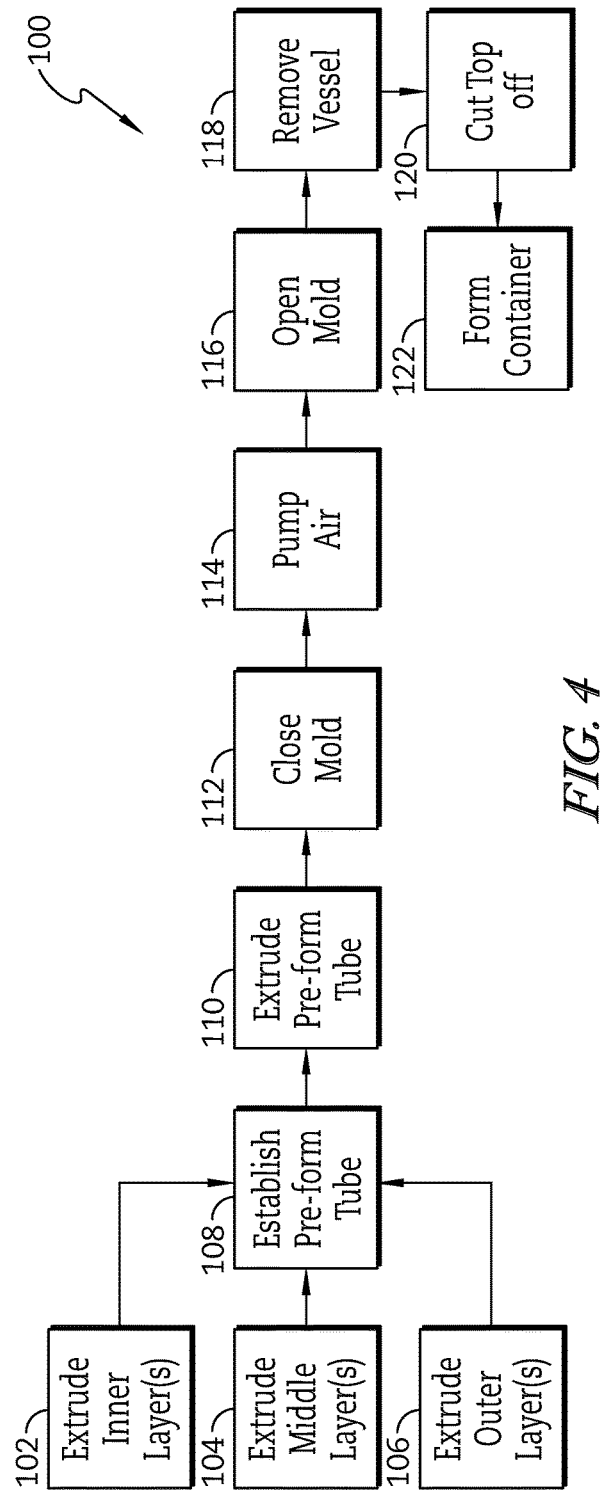

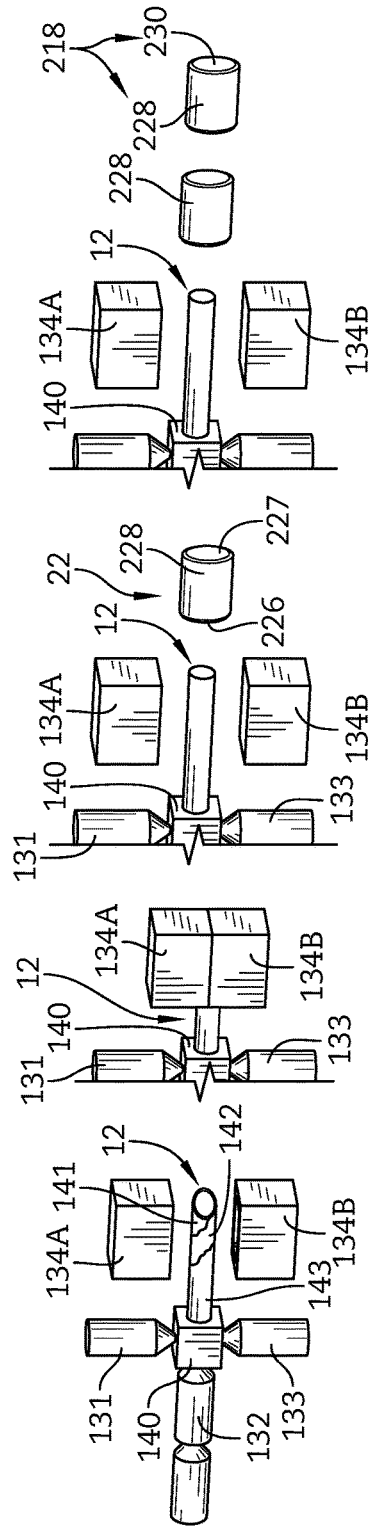
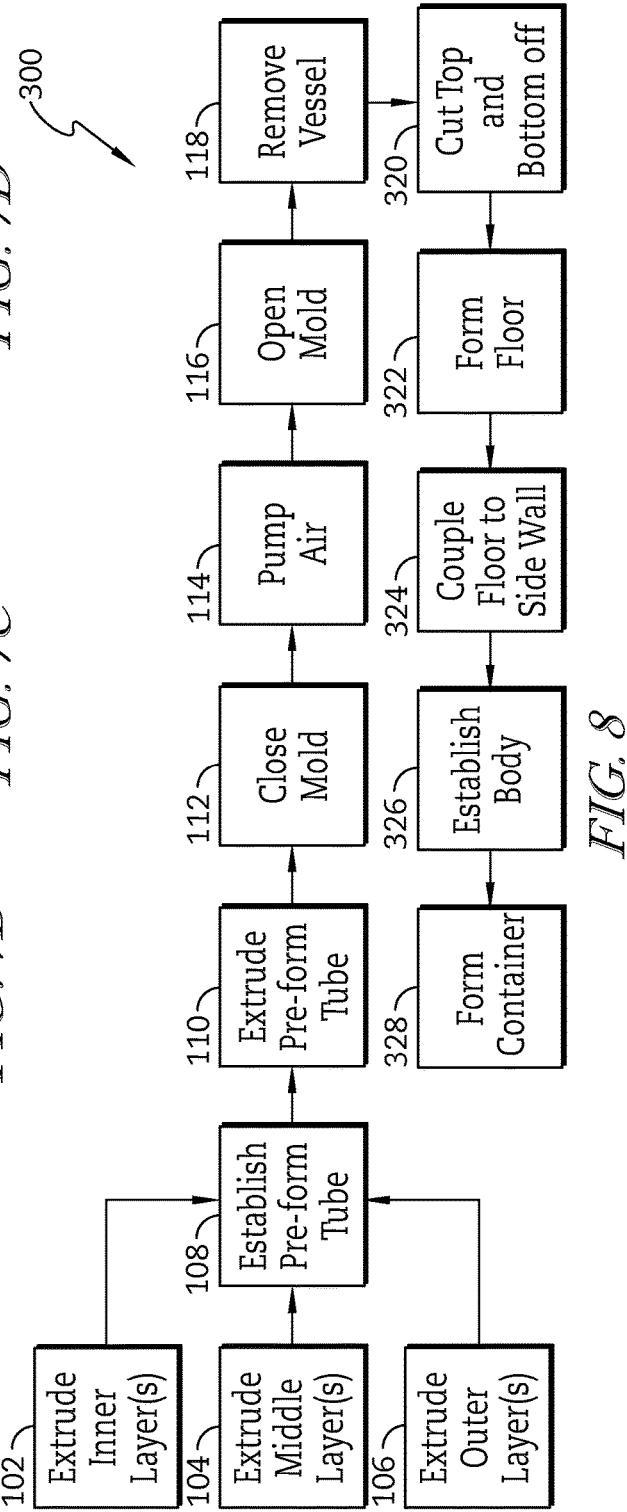

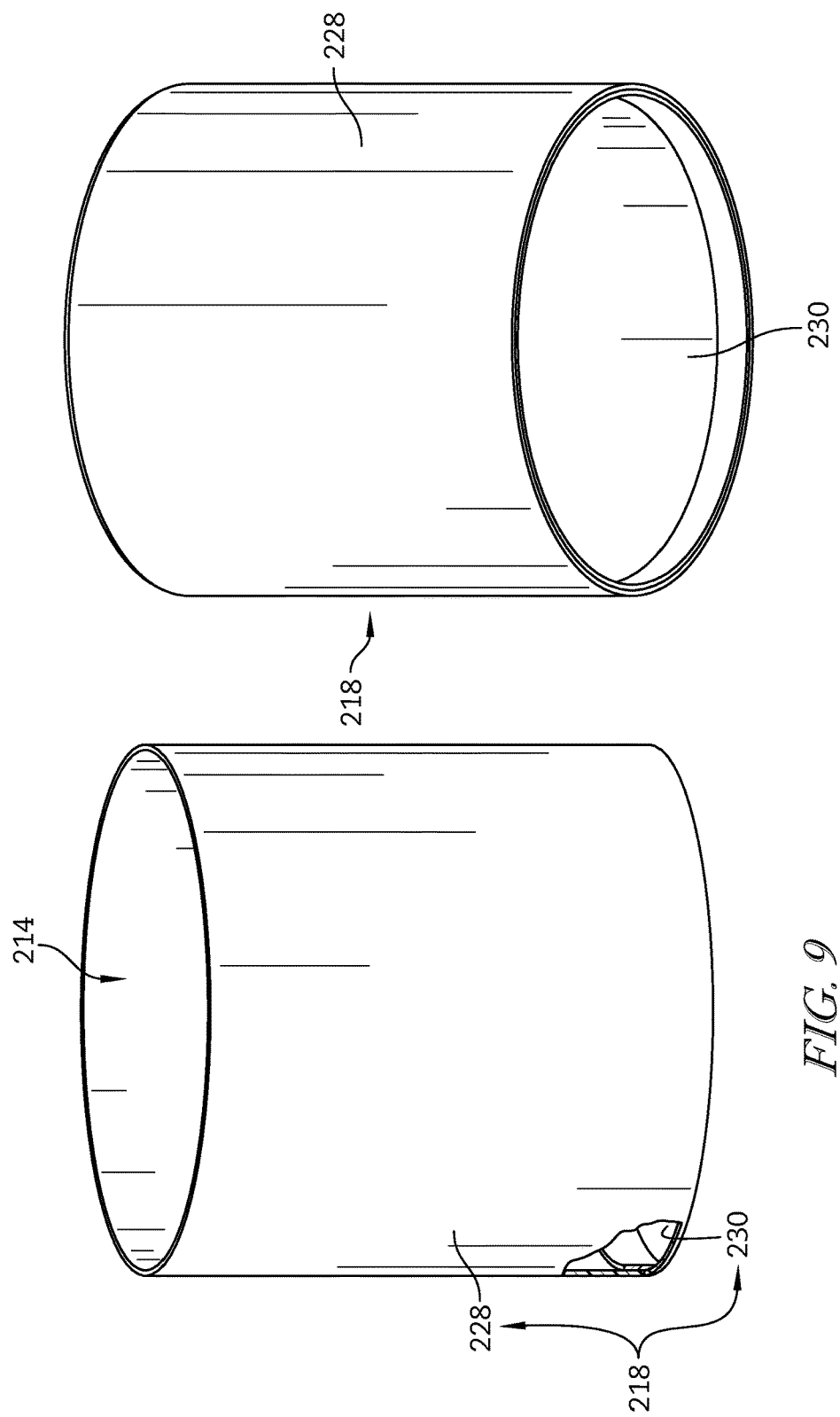

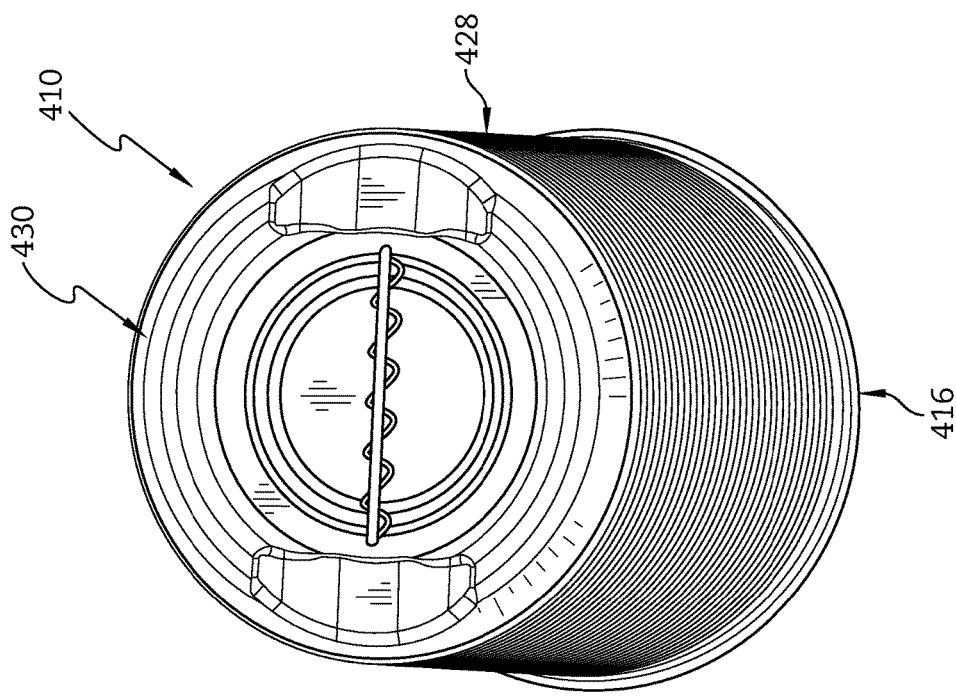
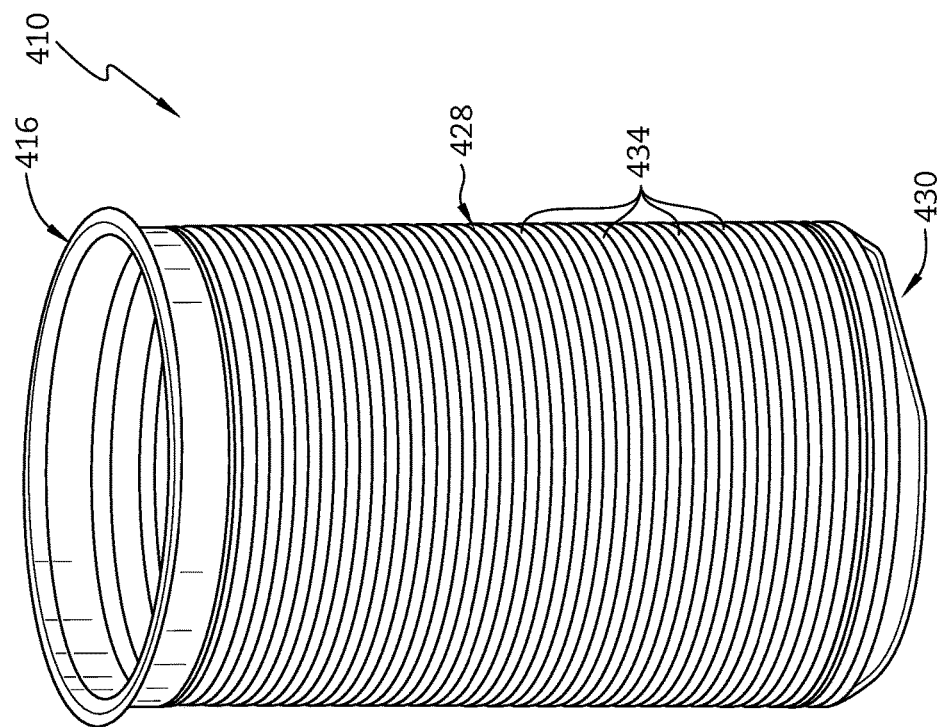

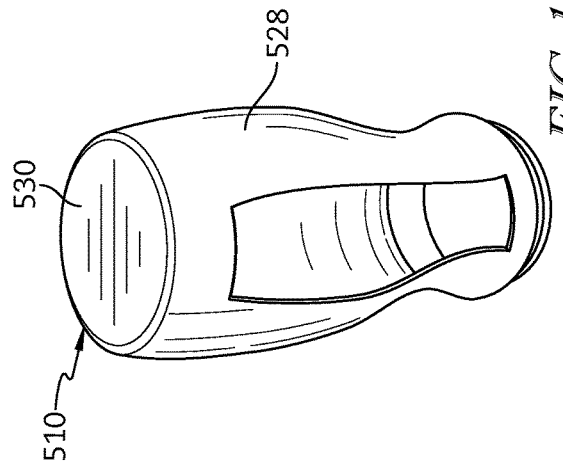
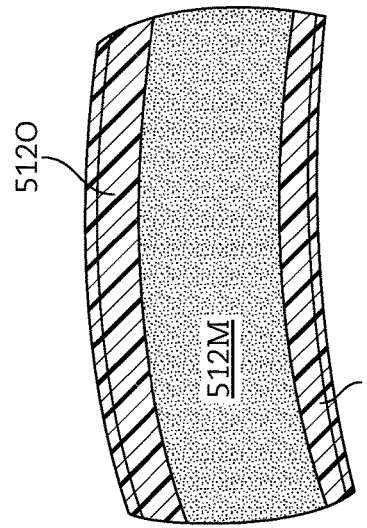
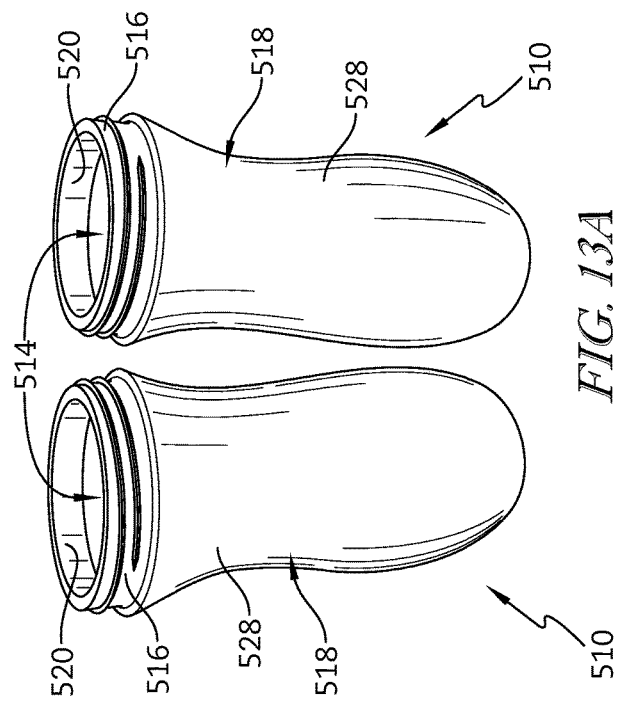
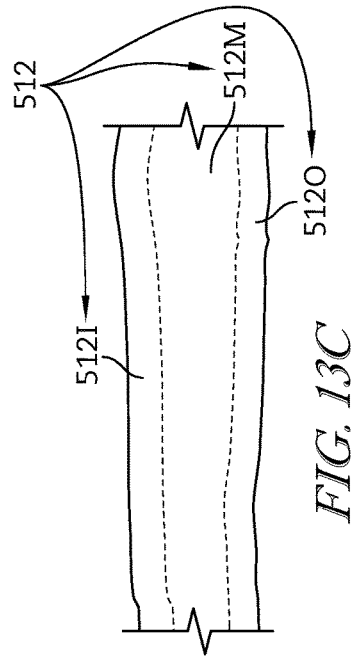
FIG. 13A
FIG. 13B
FIG. 13C
FIG. 13D

US 10,246,209 B2

CONTAINER

PRIORITY CLAIM

This application is a continuation of U.S. application Ser. No. 15/383,115, filed Dec. 19, 2016, which is a continuation of U.S. application Ser. No. 14/787,901, filed Oct. 29, 2015, which claims priority to International (PCT) Application No. PCT/US14/027,551, filed Mar. 14, 2014, which claims priority to U.S. Provisional Application Ser. No. 61/783,994, filed Mar. 14, 2013, each of which is expressly incorporated by reference herein.

BACKGROUND

The present disclosure relates to vessels, and in particular to cup or bottles. More particularly, the present disclosure relates to a cup formed from polymeric materials.

SUMMARY

A vessel in accordance with the present disclosure is configured to hold a product in an interior region. In illustrative embodiments, the vessel is an insulated container such as a drink cup. In illustrative embodiments, the vessel is a container such as a shampoo bottle.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a first embodiment of a container in accordance with the present disclosure showing that the container includes, from top to bottom, a brim, a side wall, and a floor, and suggesting that the container is formed from a multilayer tube according to a container-manufacturing process as suggested in FIGS. 3A-4;

FIG. 2 is an enlarged sectional view of a portion of a side wall included in the container of FIG. 1 showing that the side wall is made form a multilayer tube that includes, from left to right, an outer polymeric layer, a middle cellular non-aromatic polymeric layer, and an inner polymeric layer;

FIGS. 3A-3C are a series of partial perspective view of a first embodiment of a container-manufacturing process in accordance with the present disclosure showing the formation of the container of FIG. 1;

FIG. 3A is a partial perspective view of a portion of the container-manufacturing process showing that the container-manufacturing process begins with extruding an inner layer, a middle layer, and an outer layer to establish a multi-layer tube that is received between two mold halves for forming as suggested in FIG. 3B;

FIG. 3B is a view similar to FIG. 3A showing the two mold halves in a closed position trapping the multilayer tube therebetween in a mold cavity formed by the two mold have when the two mold have are closed;

FIG. 3C is a view similar to FIG. 3B showing the two mold halves in an opened position and a molded vessel being ejected from the mold halves for further processing to establish the container of FIG. 1 as suggested in FIG. 4;

Figure 6:
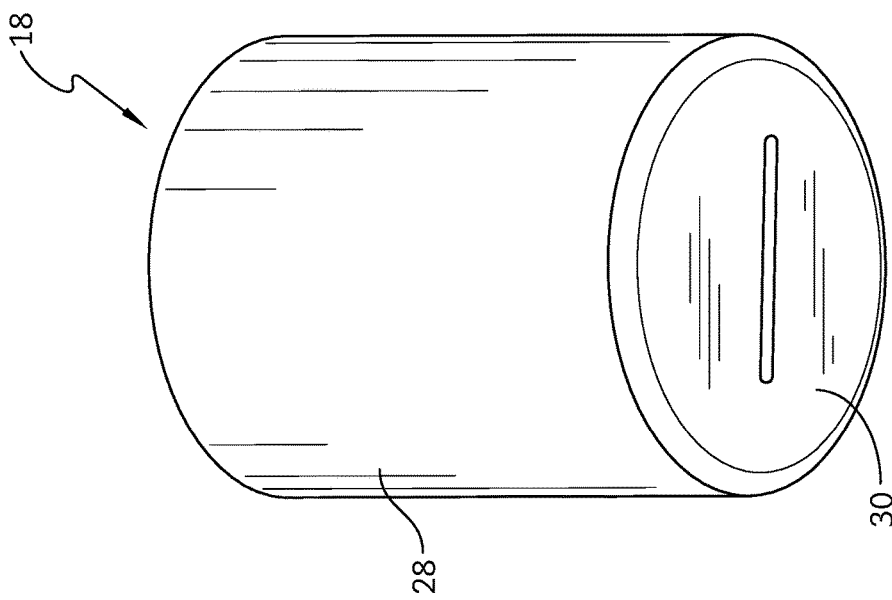
Figure 5:
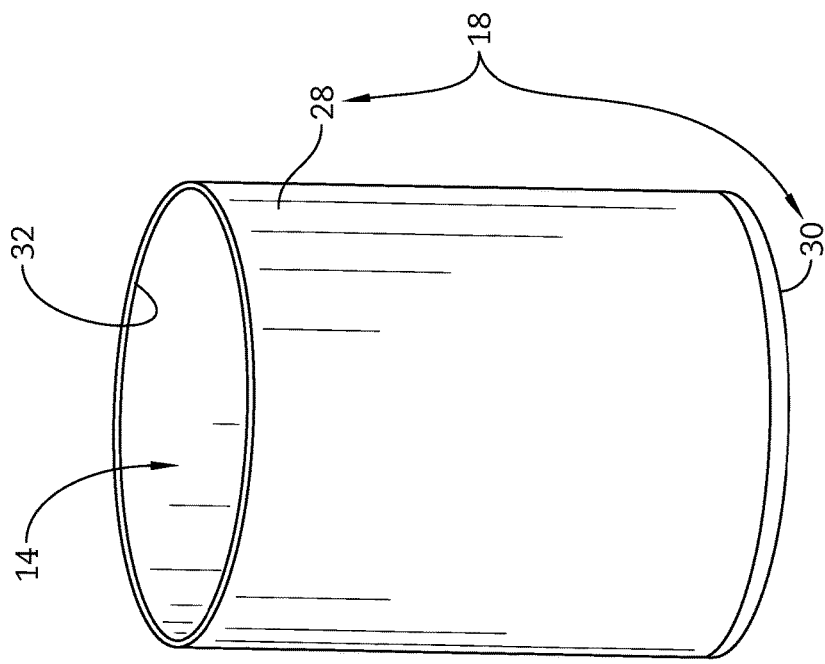
Figure 13E:
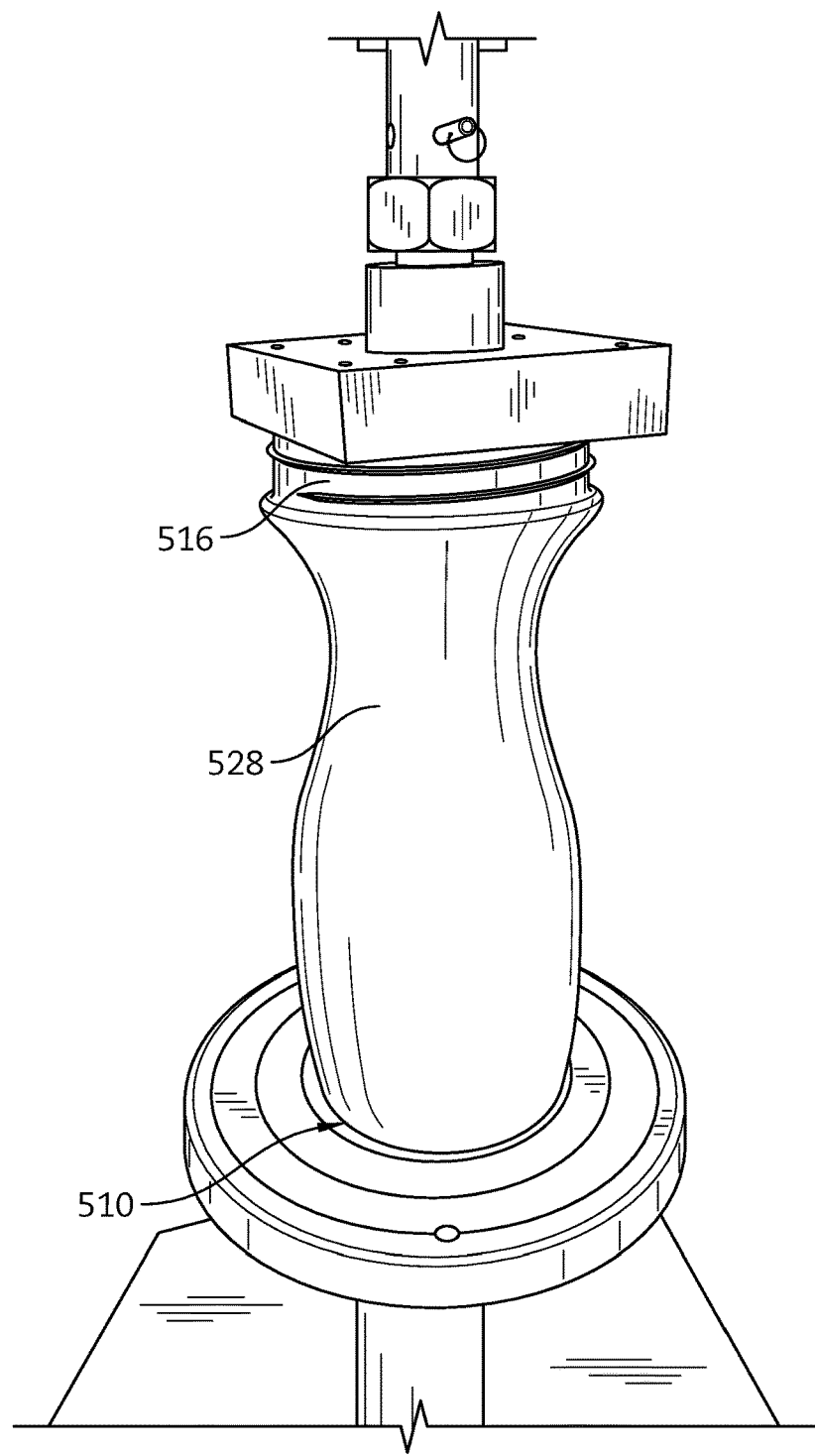
Figure 14A:
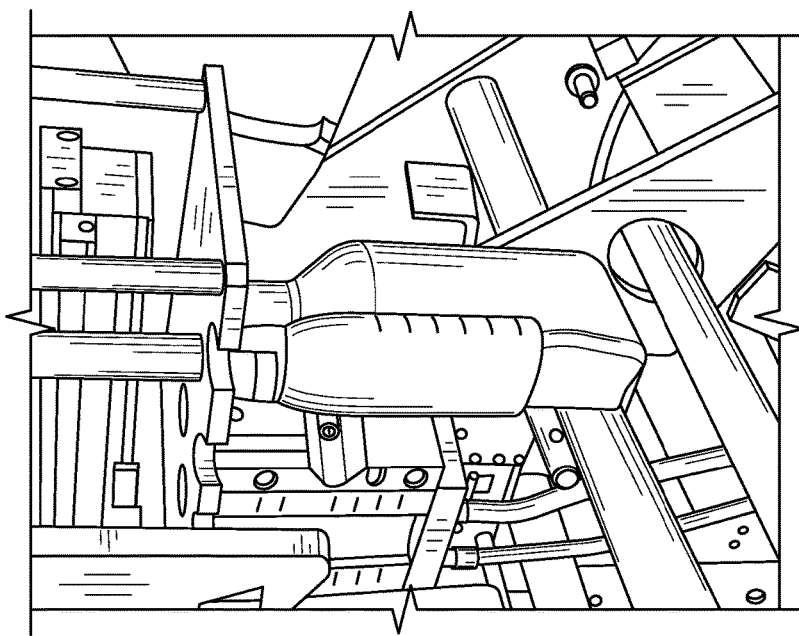
Figure 14B:
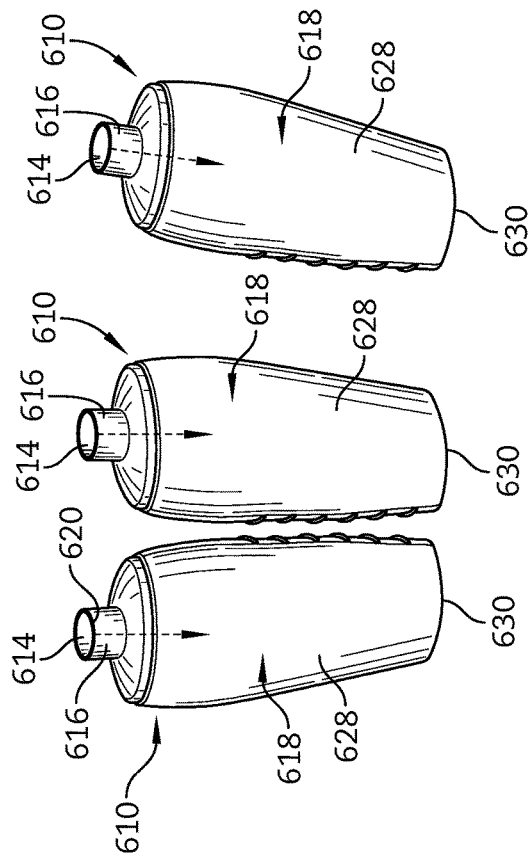
Figure 14C:
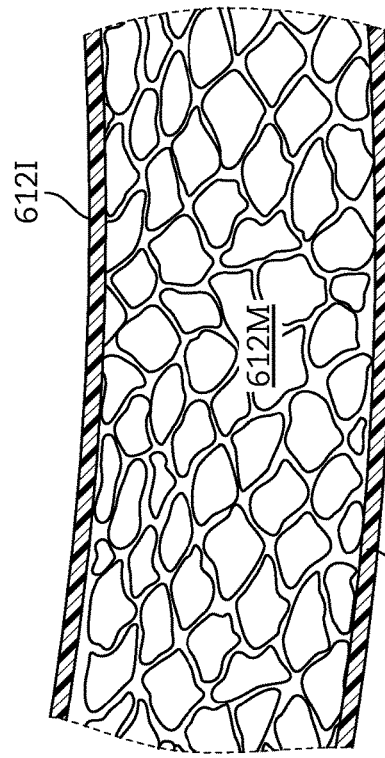
Figure 14E:
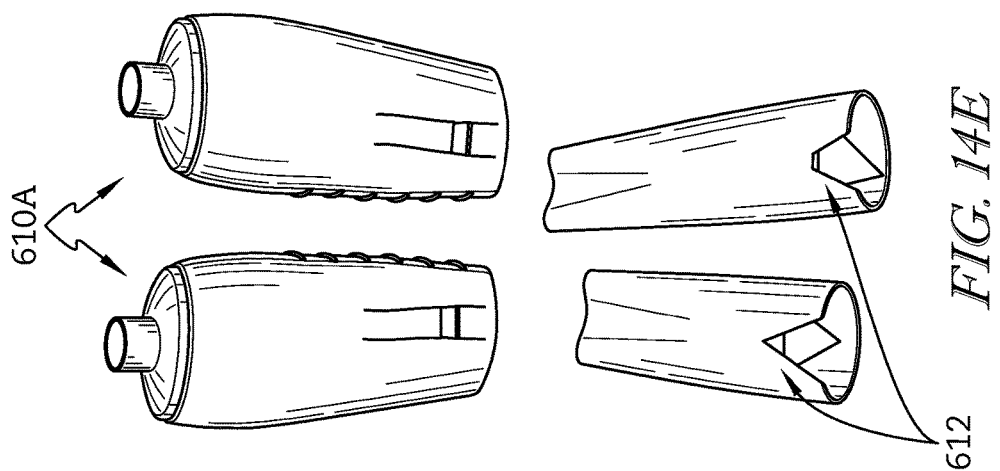
Figure 14D:
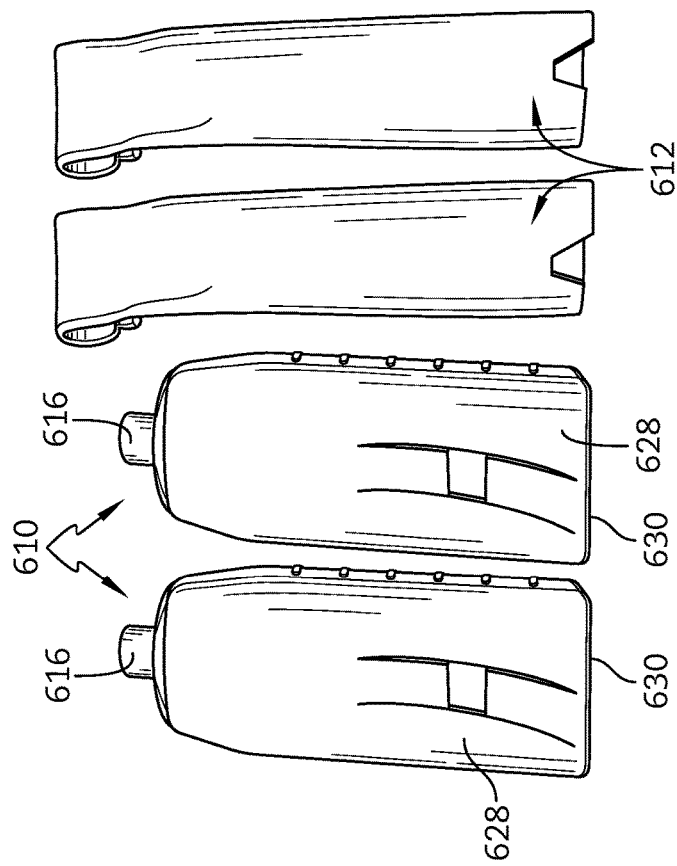
Figure 15:
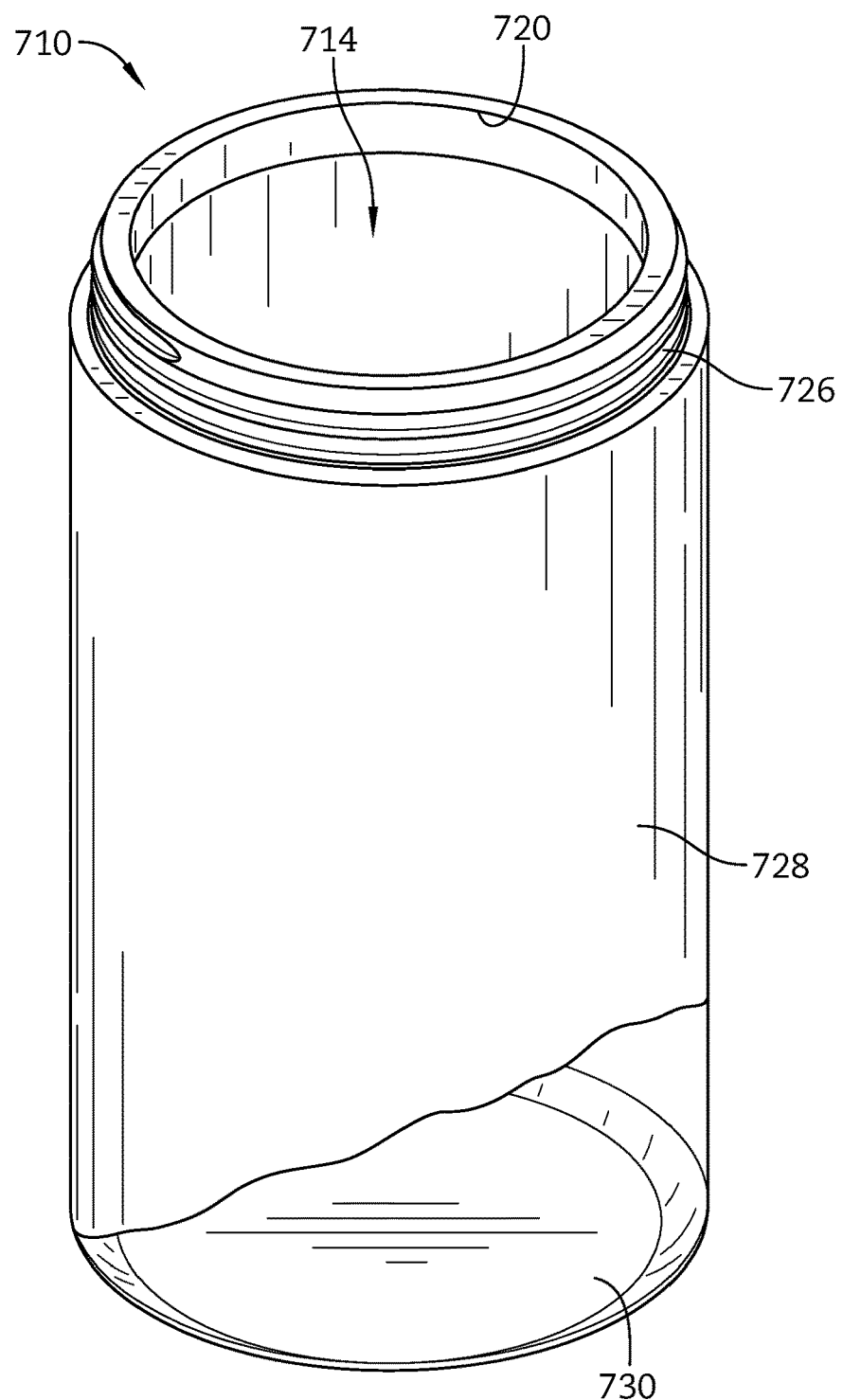
Figure 16:
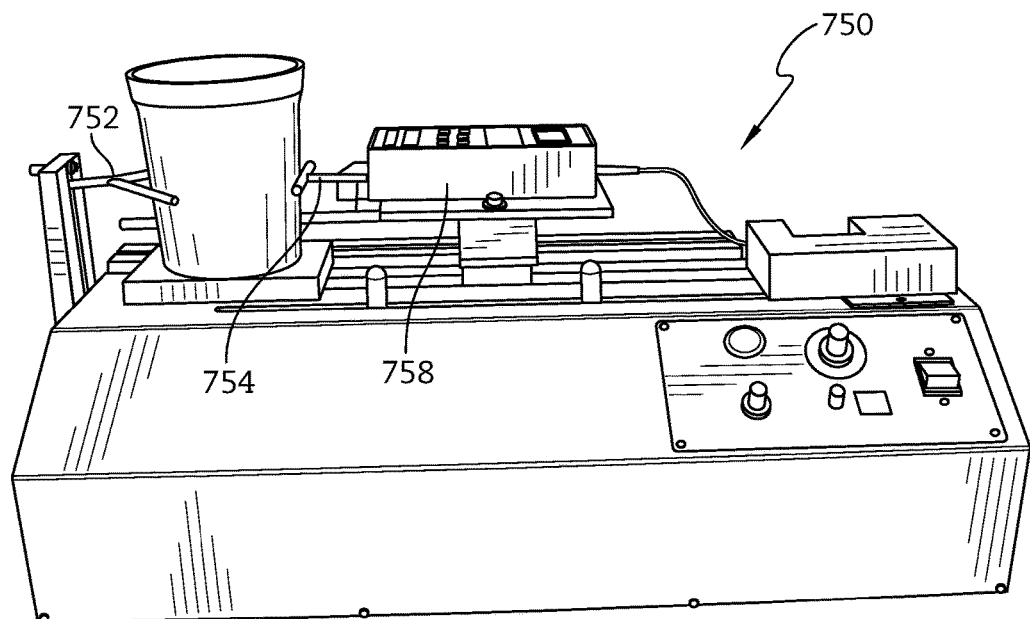
Figure 17:
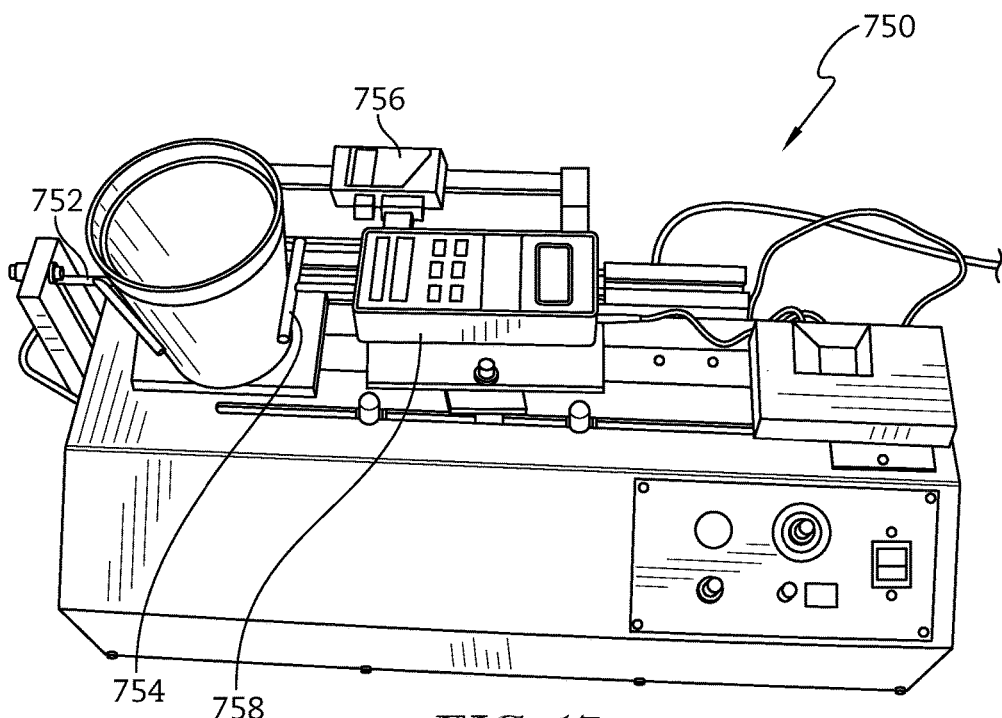
Figure 18:
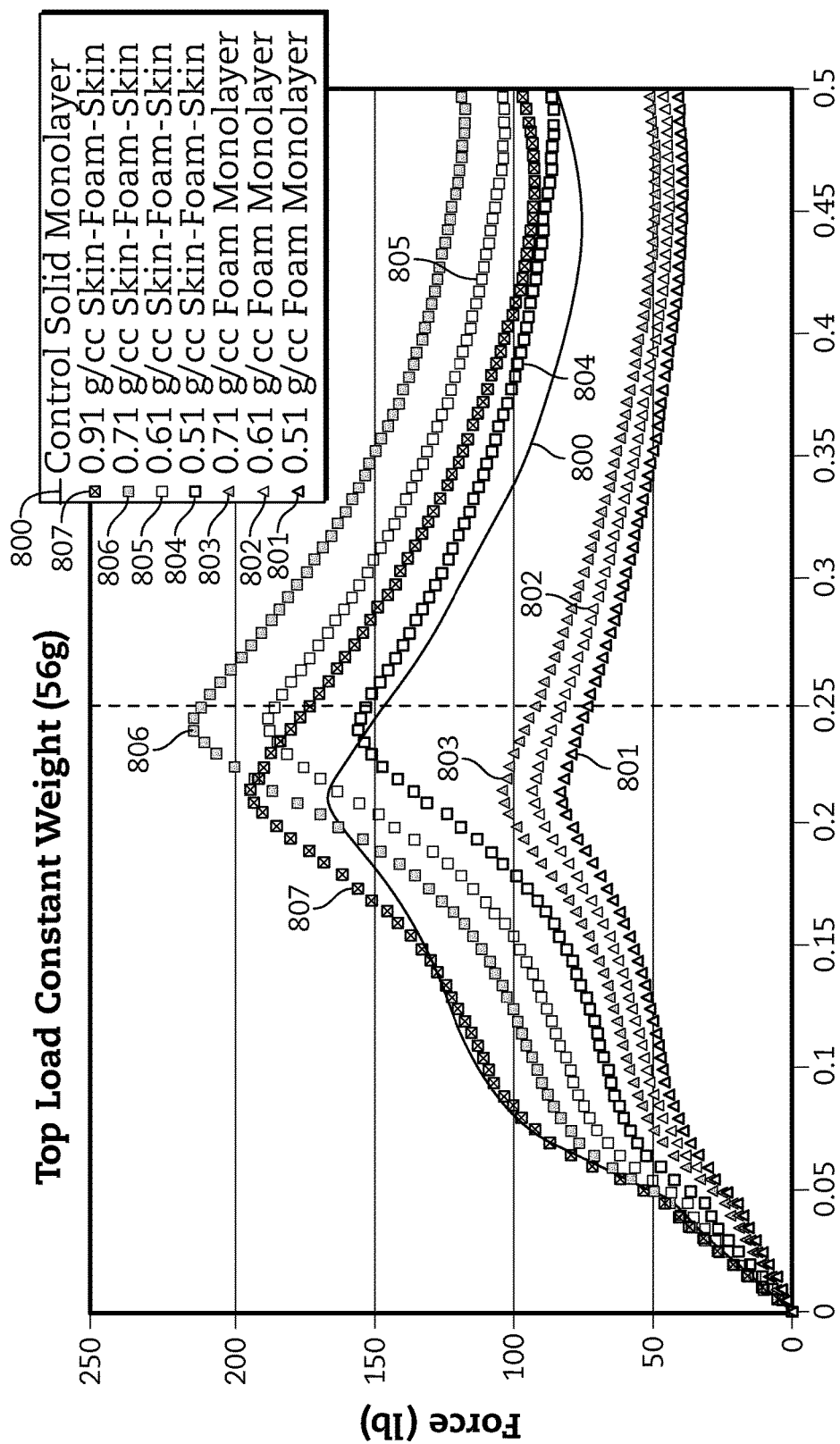
Figure 19:
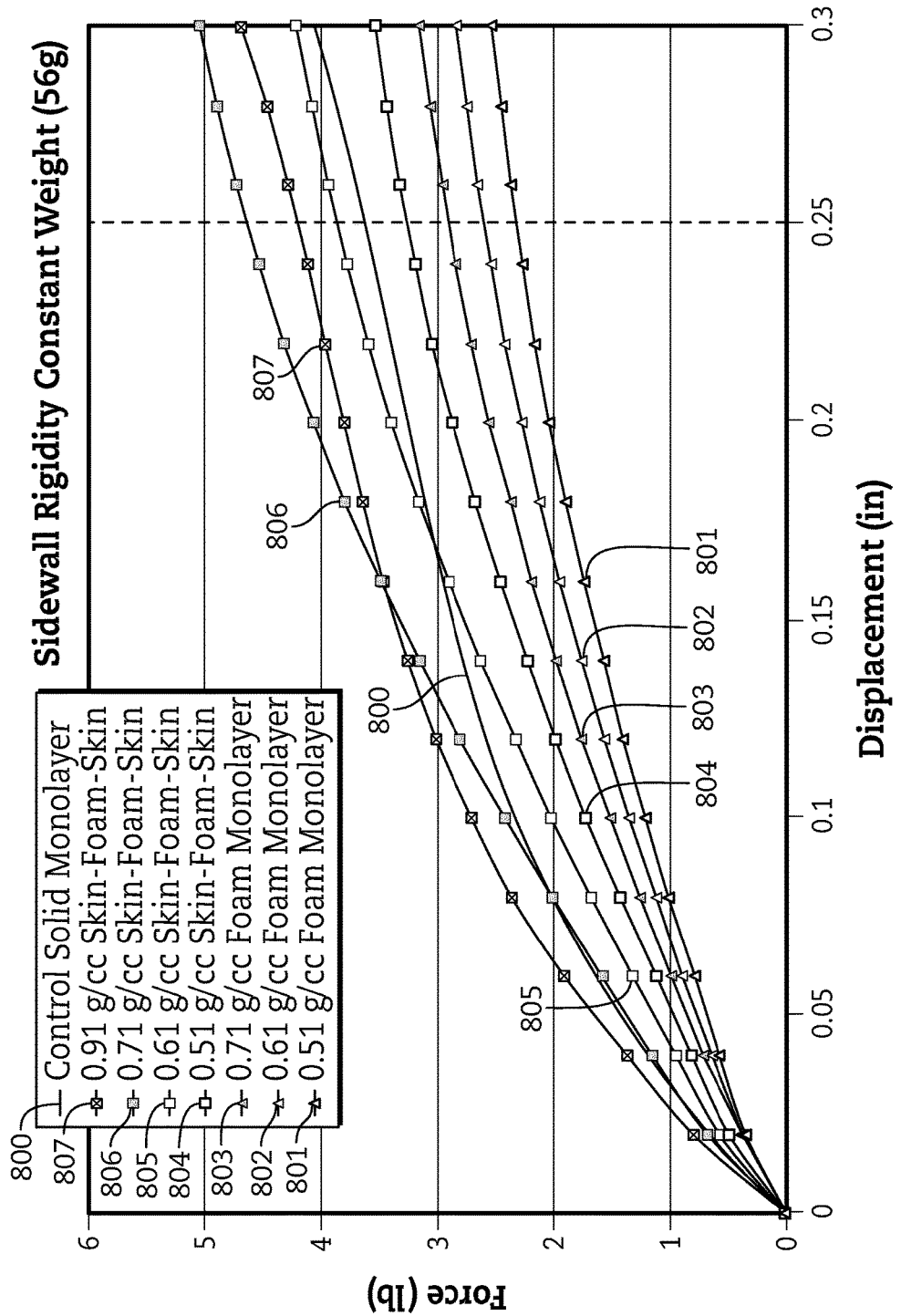
Figure 20:
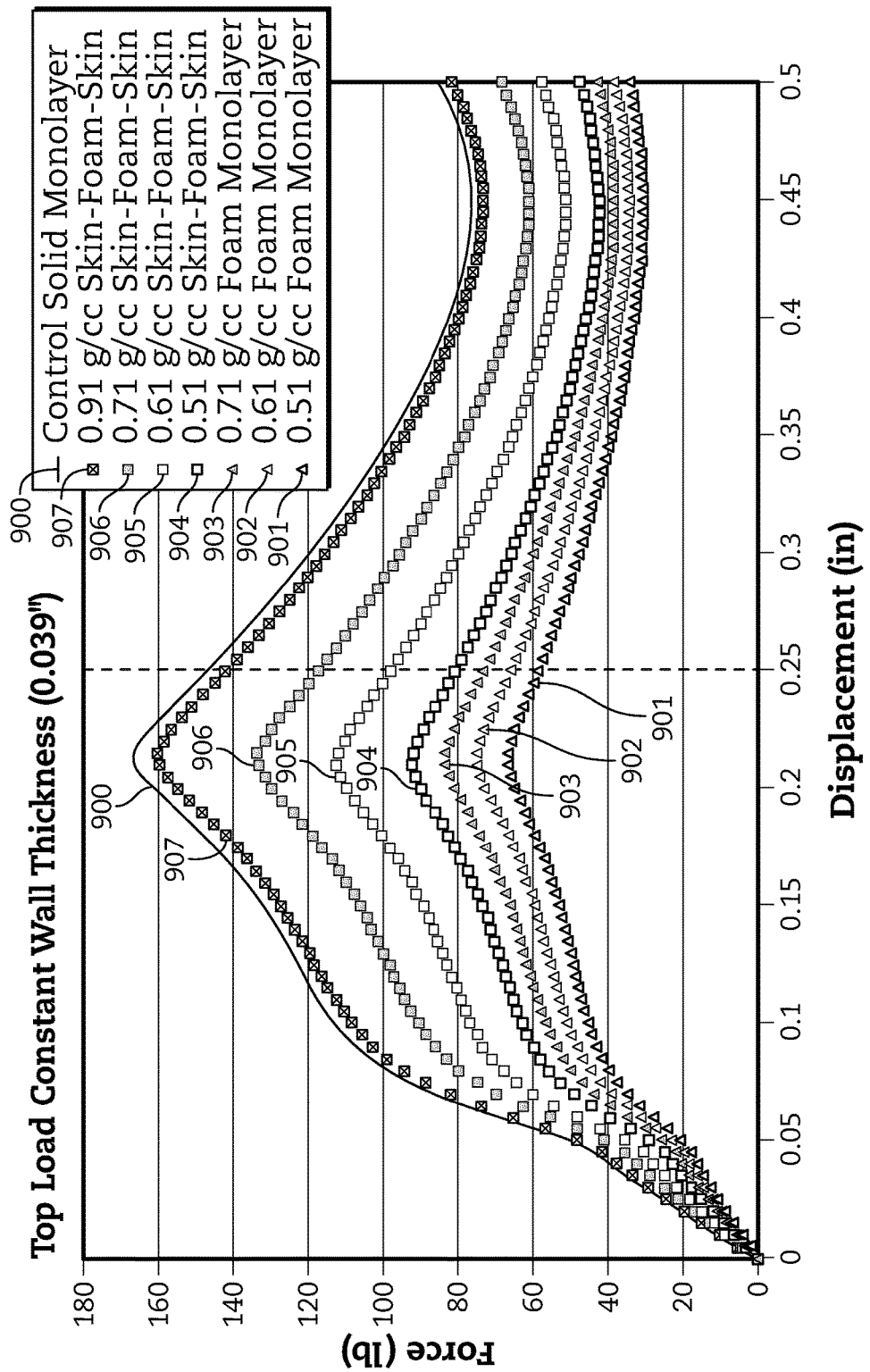
Figure 21:
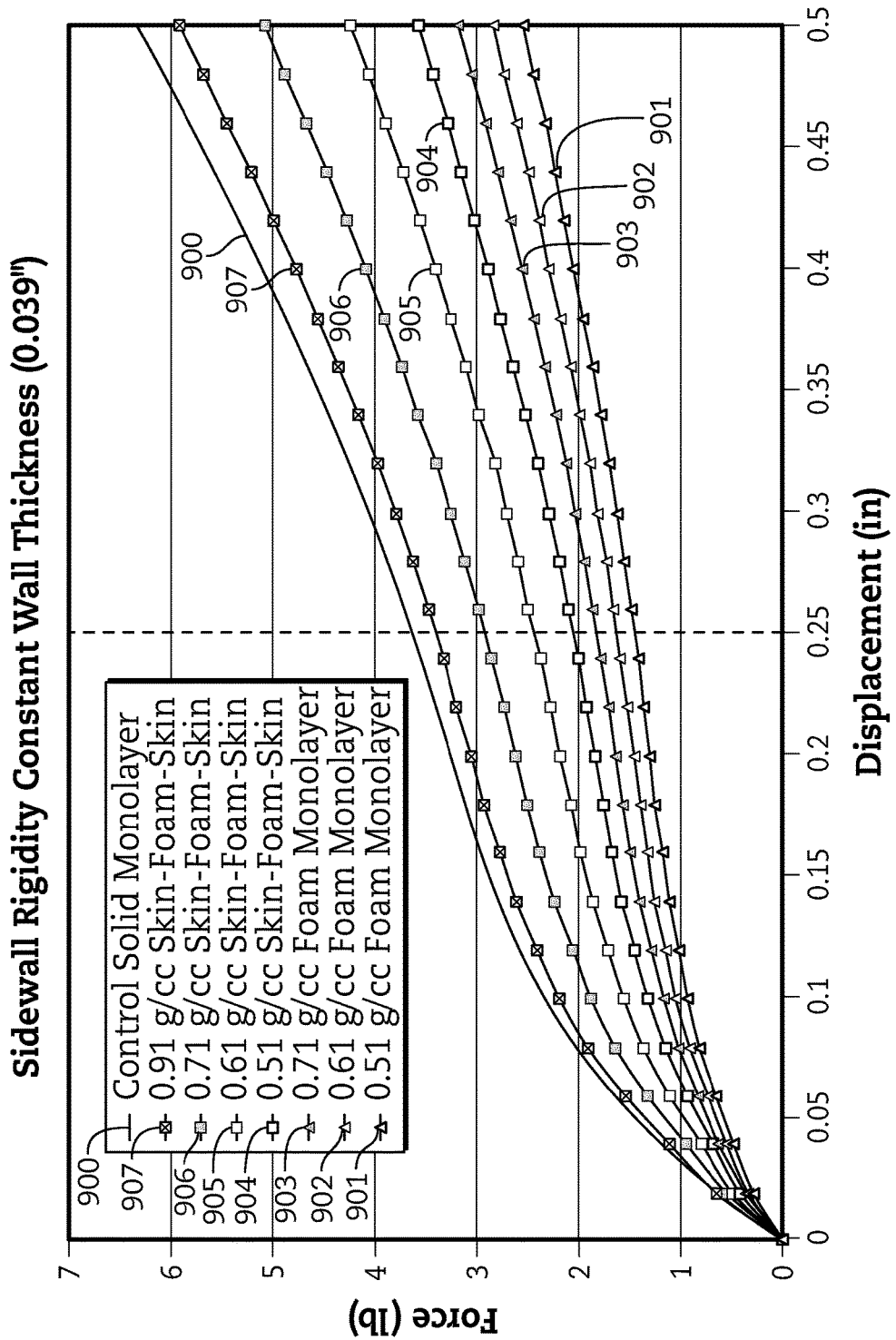
Figure 22:
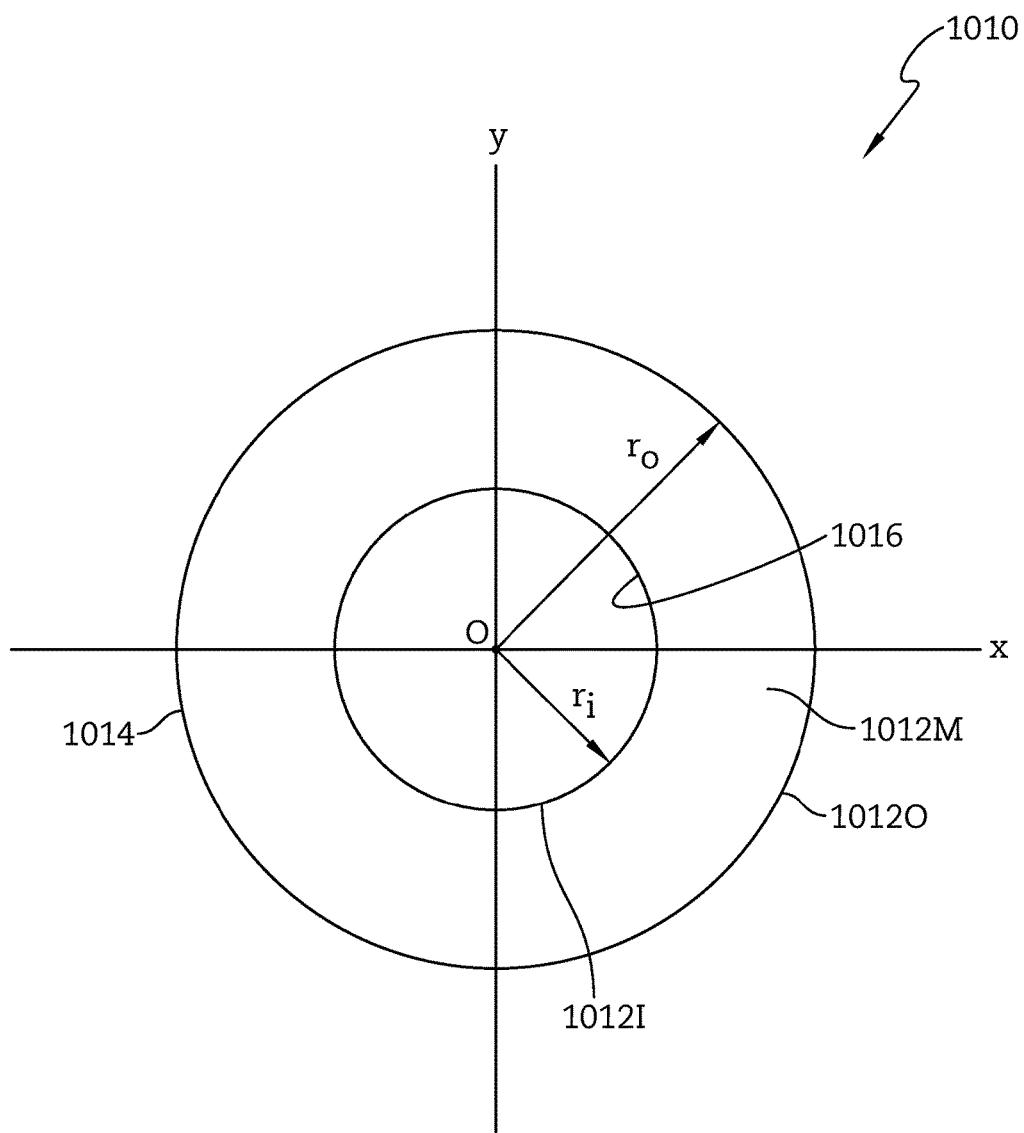

FIG. 4 is a diagrammatic view of the container-manufacturing process of FIGS. 3A-3C showing that the container-manufacturing process includes the operations extruding the inner layer that provides the inner polymeric layer, extruding the middle layer that provides the middle insulative cellular non-aromatic polymeric layer, extruding the outer layer that provides the outer polymeric layer, establishing a pre-form multilayer tube, extruding the pre-form multilayer tube into an open mold cavity, closing the mold, pumping air into the pre-form multilayer tube in the mold cavity to cause the multi-layer tube to expand and take the shape of the mold cavity, opening the mold, removing the vessel from the mold cavity, cutting a top portion off the vessel to establish a body as suggested in FIG. 5, and forming the container of FIG. 1 from the body;

FIG. 5 is a view similar to FIG. 1 showing the body formed during the container-manufacturing process of FIG. 4;

FIG. 6 is a perspective view taken from a bottom of the body showing a floor included in the container;

FIGS. 7A-7D are a series of partial perspective view of a second embodiment of a container-manufacturing process in accordance with the present disclosure showing the formation a body as suggested in FIG. 9 that processed to form a container;

FIG. 7A is a partial perspective view of a portion of the container-manufacturing process showing that the container-manufacturing process begins with extruding an inner layer, a middle layer, and an outer layer to establish a multi-layer tube that is received between two mold halves for forming as suggested in FIG. 7B;

FIG. 7B is a view similar to FIG. 7A showing the two mold halves in a closed position trapping the multilayer tube therebetween in a mold cavity formed by the two mold have when the two mold have are closed;

FIG. 7C is a view similar to FIG. 7B showing the two mold halves in an opened position and a molded vessel being ejected from the mold halves for further processing where a cutting operation removes a top and bottom end of the vessel to establish a side wall;

FIG. 7D is a view similar to FIG. 7C showing the side wall after the cutting operation has been performed and a floor has been coupled to a bottom end of the side wall to establish a body as suggested in FIG. 9;

FIG. 8 is a diagrammatic view of the container-manufacturing process of FIGS. 7A-7D showing that the container-manufacturing process includes the operations extruding the inner layer that provides the inner polymeric layer, extruding the middle layer that provides the middle insulative cellular non-aromatic polymeric layer, extruding the outer layer that provides the outer polymeric layer, establishing a pre-form multilayer tube, extruding the pre-form multilayer tube into an open mold cavity, closing the mold, pumping air into the pre-form multilayer tube in the mold cavity to cause the multi-layer tube to expand and take the shape of the mold cavity, opening the mold, removing the vessel from the mold cavity, cutting top and bottom portions off the vessel to establish the side wall, forming the floor, coupling the floor to the side wall to establish the body, and forming the container as suggested in FIG. 9;

FIG. 9 is a perspective view of a another embodiment of the body formed using the container-manufacturing process of FIGS. 7A-8 with portions broken away to reveal that the container includes the side wall and the floor;

FIG. 10 is a perspective view taken from a bottom of the body of FIG. 9 showing the floor coupled to the side wall of the body;

FIG. 11 is a perspective view of another embodiment of a container in accordance with the present disclosure suggesting that a container including, from top to bottom, a brim, a side wall including a plurality of ribs, and a floor may be formed using the container-manufacturing processes of the present disclosure;

FIG. 12 is a perspective view taken from a bottom of the container of FIG. 11 showing the floor appended to the side wall of the container FIG. 13A is a photograph showing two containers in accordance with another embodiment of the present disclosure;

FIG. 13B is a photograph showing one of the containers of FIG. 13A with a portion of a side wall removed for photographing as suggested in FIG. 13C;

FIG. 13C is an enlarged photograph of a portion of the side wall of FIG. 13B showing that the side wall includes, from top bottom, a inner polymeric layer, a middle insulative cellular non-aromatic polymeric layer, an outer polymeric layer;

FIG. 13D is an enlarged photograph of a portion of the side wall in section showing that the side wall includes, from top to bottom, an outer polymeric layer (outside skin), a middle insulative cellular non-aromatic polymeric layer (foam core), and an inner polymeric layer (inside skin);

FIG. 13E is a photograph showing one of the containers of FIG. 13A coupled to a top-load testing device undergoing top-load testing;

FIG. 14A is a photograph showing another embodiment of a container in accordance with the present disclosure being removed from a mold cavity after air has been pumped into a pre-form multilayer tube in a mold cavity to cause the multi-layer tube to expand and take the shape of the mold cavity;

FIG. 14B is a photograph showing a series of finished containers formed in accordance with the present disclosure;

FIG. 14C is an enlarged photograph showing a section of a side wall included in the containers of FIGS. 14A and 14B showing that the side wall includes, from top bottom, a inner polymeric layer, a middle insulative cellular non-aromatic polymeric layer, and an outer polymeric layer;

FIG. 14D is a photograph showing two containers formed in accordance with the present disclosure and two multi-layer tubes used to form the containers;

FIG. 14E is a photograph showing two containers formed in accordance with the present disclosure and two multi-layer tubes used to form the containers;

FIG. 15 is a perspective view of another embodiment of a container formed in accordance with the present disclosure and subjected to both side-wall rigidity testing as suggested in FIGS. 16 and 17 and top-load testing;

FIG. 16 is a photograph of a side-wall rigidity testing apparatus used to test side-wall rigidity of various containers, the photograph showing an illustrative container located between a stationary Y-bar and a movable T-bar used to deform the side wall of the container;

FIG. 17 is a view similar to FIG. 16 showing that the side-wall rigidity testing apparatus includes a force gauge coupled to the T-bar to measure force applied to the side wall of the container and a travel gauge coupled to the force gauge to measure a distance the side wall has been deformed;

FIG. 18 is a graph showing results of top-load testing for various containers having different densities and different constructions but all the containers having a similar weight of about 56 grams;

FIG. 19 is a graph showing results of sidewall-rigidity testing for various containers having different densities and different constructions but all the containers having a similar weight of about 56 grams;

FIG. 20 is a graph showing results of top-load testing for various containers having different densities and different constructions but all the containers having a similar wall thickness of about 0.039 inches;

FIG. 21 is a graph showing results of sidewall-rigidity testing for various containers having different densities and different constructions but all the containers having a similar wall thickness of about 0.039 inches; and FIG. 22 is a diagrammatic view of another embodiment of a vessel made using a multi-layer tube including an inner polymeric layer, and outer polymeric layer, and a middle insulative cellular non-aromatic polymeric layer therebetween and showing that the vessel has been sectioned through an X-Y plane so as to identify reference radius $r_o$ and $r_i$ which may be used to calculate a moment area of inertia for the vessel.

DETAILED DESCRIPTION

A first embodiment of a container 10 in accordance with the present disclosure is shown in FIG. 1. Container 10 is made from a multi-layer tube 12, also called multi-layer parison 12, as shown in FIGS. 3A-3C and 7A-7C. Multi-layer tube 12 includes an inner polymeric layer 12I, a middle cellular non-aromatic polymeric layer 12M, and an outer polymeric layer 12O as shown in FIG. 2. Container 10 is formed using a first embodiment of a container-manufacturing process 100 as shown, for example, in FIGS. 3A-4. Another embodiment of a body 218 in accordance with the present disclosure is shown, for example in FIGS. 9 and 10. Body 218 is formed during and used in a second embodiment of a container-manufacturing process 300 as shown, for example, in FIGS. 7A-8. Still yet another embodiment of a container 410 formed using one of the container-manufacturing process of the present disclosure is shown, for example, in FIGS. 11 and 12. Another embodiment of a container 510 formed using one of the container-manufacturing processes of the present disclosure is shown, for example, in FIGS. 13A and 13E. Another embodiment of a container 610 is formed using one of the container-manufacturing processes of the present disclosure is shown, for example, in FIGS. 14B, 14D, and 14E. Still yet another embodiment of a container 710 is formed using the container-manufacturing processes of the present disclosure and is shown in FIG. 15. Container 710 is subjected to both side-wall rigidity testing and top-loading testing in various configurations as show in FIGS. 18-21.

Container 10 is made during container-manufacturing process 100 from multi-layer tube 12 as shown in FIG. 3A-3C. Multi-layer tube 12 includes inner polymeric layer 12I, middle cellular non-aromatic polymeric layer 12M, and outer polymeric layer 12O as shown in FIG. 2. In one example, inner polymeric layer 12I, middle insulative cellular non-aromatic polymeric layer 12M, and outer polymeric layer 12O are made from the same polymeric material or materials. In another example, each of the inner polymeric layer 12I, middle insulative cellular non-aromatic polymeric layer 12M, and outer polymeric layer 12O are made from different materials.

In one example, inner and outer polymeric layers 12I, 12O are made from polypropylene. In another example, inner and outer polymeric layers 12I, 12O are made from high density polyethylene. In still yet another example, one of the polymeric layers may include a polymeric material and an oxygen barrier material such as Ethylene Vinyl Alcohol (EVOH). However, inner and outer polymeric layers 12I, 12 may be made from any suitable polymeric material.

Middle insulative cellular non-aromatic polymeric layer 12M is configured to provide means for insulating a beverage or food placed in an interior region 14 formed in container 10, forming a structure having sufficient mechanical characteristics to support the beverage or food, and providing resistance to deformation and puncture. In one example, middle insulative cellular non-aromatic polymeric layer 12M is made from an insulative cellular non-aromatic high density polyethylene material. In another example, middle insulative cellular non-aromatic polymeric layer 12M is made from a predominantly polypropylene material. Reference is hereby made to U.S. application Ser. No. 13/491,007, filed Jun. 7, 2012 and titled POLYMERIC MATERIAL FOR AN INSULATED CONTAINER and to U.S. application Ser. No. 14/063,252, filed May 1, 2014 and titled POLYMERIC MATERIAL FOR AN INSULATED CONTAINER, for disclosure relating to a formulation used to make polypropylene based insulative cellular non-aromatic polymeric material, which application is hereby incorporated in its entirety herein.

In one exemplary embodiment, a formulation used to produce the cellular polymeric material includes at least one polymeric material. The polymeric material may include one or more base resins. In one example, the base resin is polypropylene. In an illustrative embodiment, a base resin can include Borealis WB140 HMS polypropylene homopolymer. In another illustrative embodiment, a base resin can include Braskem F020HC polypropylene homopolymer. In an embodiment, a base resin can include both Borealis WB140 HMS polypropylene homopolymer and Braskem F020HC polypropylene homopolymer.

In embodiments with more than one polypropylene copolymer base resin, different polypropylene copolymers can be used depending on the attributes desired in the formulation. Depending on the desired characteristics, the ratio of two polypropylene resins may be varied, e.g., 10%/90%, 20%/80%, 25%/75%, 30%/70%, 35%/65%, 40%/60%, 45%/55%, 50%/50%, etc. In an embodiment, a formulation includes three polypropylene resins in the base resin. Again, depending on the desired characteristics, the percentage of three polypropylene resins can be varied, 33%/33%/33%, 30%/30%/40%, 25%/25%/50%, etc.

In illustrative embodiments, a polymeric material includes a primary base resin. In illustrative embodiments, a base resin may polypropylene. In illustrative embodiments, an insulative cellular non-aromatic polymeric material comprises a polypropylene base resin having a high melt strength, a polypropylene copolymer or homopolymer (or both). In an embodiment, a formulation of the polymeric material comprises about 50 wt % to about 100 wt %, about 70 wt % to about 100 wt %, about 50 wt % to about 99 wt %, 50 wt % to about 95 wt %, about 50 wt % to about 85 wt %, about 55 wt % to about 85 wt %, about 80 wt % to about 85 wt %, about 80 wt % to about 90 wt %, about 80 wt % to about 91 wt %, about 80 wt % to about 92 wt %, about 80 wt % to about 93 wt %, about 80 wt % to about 94 wt %, about 80 wt % to about 95 wt %, about 80 wt % to about 96 wt %, about 80 wt % to about 97 wt %, about 80 wt % to about 98 wt %, about 80 wt % to about 99 wt %, about 85 wt % to about 90 wt %, or about 85 wt % to about 95 wt % of the primary base resin. In an embodiment, a colorant can be about 80%, 81%, 82%, 83%, 84%, 85%, 86%, 87%, 88%, 89%, 90%, 91%, 92%, 93%, 94%, 95%, 96%, 97%, 98%, 99%, or 100%.

As defined hereinbefore, any suitable primary base resin may be used. One illustrative example of a suitable polypropylene base resin is DAPLOY™ WB140 homopolymer (available from Borealis A/S) which is a high melt strength structural isomeric modified polypropylene homopolymer.

In illustrative embodiments, a polymeric material includes a secondary resin, wherein the secondary resin can be a polypropylene copolymer or homopolymer (or both). In another embodiment, a secondary resin can be about 0 wt % to about 50 wt %, about 0 wt % to about 30 wt %, about 0 wt % to about 25 wt %, about 0 wt % to about 20 wt %, about 0 wt % to about 15 wt %, about 10 wt % to about 50 wt %, about 10 wt % to about 40 wt %, about 10 wt % to about 30 wt %, about 10 wt % to about 25 wt %, about 10 wt % to about 20 wt %, or about 10 wt % to about 15 wt % of a secondary resin. In an embodiment, a polymeric material includes about 0 wt %, about 10 wt %, about 15 wt %, about 20 wt %, about 25 wt %, or about 30 wt %. In an embodiment, a polymeric material does not have a secondary resin. In a particular embodiment, a secondary resin can be a high crystalline polypropylene homopolymer, such as F020HC (available from Braskem) or PP 527K (available from Sabic). In an embodiment, a polymeric material lacks a secondary resin.

Nucleating agent means a chemical or physical material that provides sites for cells to form in a molten formulation mixture. Nucleating agents may include chemical nucleating agents and physical nucleating agents. The nucleating agent may be blended with the formulation that is introduced into the hopper of the extruder. Alternatively, the nucleating agent may be added to the molten resin mixture in the extruder.

Suitable physical nucleating agents have desirable particle size, aspect ratio, and top-cut properties. Examples include, but are not limited to, talc, $CaCO_3$, mica, and mixtures of at least two of the foregoing. One representative example is Heritage Plastics HT6000 Linear Low Density Polyethylene (LLDPE) Based Talc Concentrate.

Suitable chemical nucleating agents decompose to create cells in the molten formulation when a chemical reaction temperature is reached. These small cells act as nucleation sites for larger cell growth from a physical or other type of blowing agent. In one example, the chemical nucleating agent is citric acid or a citric acid-based material. One representative example is HYDROCEROL™ CF-40E (available from Clariant Corporation), which contains citric acid and a crystal nucleating agent.

A "blowing agent" refers to a physical or a chemical blowing agent (or combination of materials) that acts to expand nucleation sites. Blowing agents may include only chemical blowing agents, only physical blowing agents, combinations thereof, or several types of chemical and physical blowing agents. The blowing agent acts to reduce density by forming cells in the molten formulation at the nucleation sites. The blowing agent may be added to the molten resin mixture in the extruder.

Chemical blowing agents are materials that degrade or react to produce a gas. Chemical blowing agents may be endothermic or exothermic. Chemical blowing agents typically degrade at a certain temperature to decompose and release gas. One example of a chemical blowing agent is citric acid or citric-based material. One representative example is HYDROCEROL™ CF-40E (available from Clariant Corporation), which contains citric acid and a crystal nucleating agent. Here, the citric acid decomposes at the appropriate temperature in the molten formulation and forms a gas which migrates toward the nucleation sites and grows cells in the molten formulation. If sufficient chemical blowing agent is present, the chemical blowing agent may act as both the nucleating agent and the blowing agent.

In another example, chemical blowing agents may be selected from the group consisting of azodicarbonamide; azodiisobutyro-nitrile; benzenesulfonhydrazide; 4,4-oxybenzene sulfonylsemicarbazide; p-toluene sulfonyl semicarbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoro ethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis(benzene sulfonyl hydrazide); diphenyl sulfone-3,3'-disulfonyl hydrazide; calcium azide; 4,4'-diphenyl disulfonyl azide; p-toluene sulfonyl azide; and combinations thereof.

In an illustrative embodiment, a nucleating agent can be about 0.1% to about 20% (w/w), about 0.25% to about 20%, about 0.5% to about 20%, about 0.75% to about 20%, about 1% to about 20%, about 1.5% to about 20%, about 2% to about 20%, about 2.5% to about 20%, about 3% to about 20%, about 3% to about 20%, about 4% to about 20%, about 4.5% to about 20%, about 5% to about 20%, about 0.1% to about 10%, about 0.25% to about 10%, about 0.5% to about 10%, about 0.75% to about 10%, about 1.0% to about 10%, about 1.5% to about 10%, about 1.0% to about 10%, about 2.0% to about 10%, about 2.5% to about 10%, about 3.0% to about 10%, about 3.5% to about 10%, about 4.0% to about 10%, about 4.5% to about 10%, about 5.0% to about 10%, about 0.1% to about 5%, about 0.25% to about 5%, about 0.5% to about 5%, about 0.75% to about 5%, about 1% to about 5%, about 1.5% to about 5%, about 1% to about 5%, about 2% to about 5%, about 2.5% to about 5%, about 3% to about 5%, about 3.5% to about 5%, or about 4% to about 5%, or about 4.5% to about 5%. In an embodiment, a nucleating agent can be about 0.5%, about 1%, about 1.5%, about 2%, about 2.5%, about 3%, about 4%, or about 5% (w/w). In an embodiment, the polymeric material lacks a nucleating agent. In an embodiment, the polymeric material lacks talc.

In an illustrative embodiment, a chemical blowing agent can be 0 to about 5% (w/w), about 0.1% to about 5% (w/w), about 0.25% to about 5%, about 0.5% to about 5%, about 0.75% to about 5%, about 1% to about 5%, about 1.5% to about 5%, about 2% to about 5%, about 3% to about 5%, about 4% to about 5%, 0 to about 4% (w/w), about 0.1% to about 4% (w/w), about 0.25% to about 4%, about 0.5% to about 4%, about 0.75% to about 4%, about 1% to about 4%, about 1.5% to about 4%, about 2% to about 4%, about 3% to about 4%, 0 to about 3% (w/w), about 0.1% to about 3% (w/w), about 0.25% to about 3%, about 0.5% to about 3%, about 0.75% to about 3%, about 1% to about 3%, about 1.5% to about 3%, about 2% to about 3%, 0 to about 2%, about 0.1% to about 2% (w/w), about 0.25% to about 2%, about 0.5% to about 2%, about 0.75% to about 2%, about 1% to about 2%, about 1.5% to about 2%, 0 to about 1%, about 0.1% to about 1%, about 0.5% to about 1%, or about 0.75% to about 1%. In an illustrative embodiment, a chemical blowing agent can be about 0.1%, 0.5%, 0.75%, 1%, 1.5% or about 2%. In one aspect of the present disclosure, where a chemical blowing agent is used, the chemical blowing agent may be introduced into the material formulation that is added to the hopper.

One example of a physical blowing agent is nitrogen ($N_2$). The $N_2$ is pumped into the molten formulation via a port in the extruder as a supercritical fluid. The molten material with the $N_2$ in suspension then exits the extruder via a die where a pressure drop occurs. As the pressure drop happens, $N_2$ moves out of suspension toward the nucleation sites where cells grow. Excess gas blows off after extrusion with the remaining gas trapped in the cells formed in the extrudate. Other suitable examples of physical blowing agents include, but are not limited to, carbon dioxide ($CO_2$), helium, argon, air, pentane, butane, or other alkane mixtures of the foregoing and the like.

In one aspect of the present disclosure, at least one slip agent may be incorporated into the formulation to aid in increasing production rates. Slip agent (also known as a process aid) is a term used to describe a general class of materials which are added to the formulation and provide surface lubrication to the polymer during and after conversion. Slip agents may also reduce or eliminate die drool. Representative examples of slip agent materials include amides of fats or fatty acids, such as, but not limited to, erucamide and oleamide. In one exemplary aspect, amides from oleyl (single unsaturated C-18) through erucyl (C-22 single unsaturated) may be used. Other representative examples of slip agent materials include low molecular weight amides and fluoroelastomers. Combinations of two or more slip agents can be used. Slip agents may be provided in a master batch pellet form and blended with the resin formulation. One example of a suitable slip agent is Ampacet 102823 Process Aid PE MB LLDPE.

In an embodiment, a slip agent can be about 0% to about 10% (w/w), about 0.5% to about 10% (w/w), about 1% to about 10% (w/w), about 2% to about 10% (w/w), about 3% to about 10% (w/w), about 4% to about 10% (w/w), about 5% to about 10% (w/w), about 6% to about 10% (w/w), about 7% to about 10% (w/w), about 8% to about 10% (w/w), about 9% to about 10% (w/w), about 0% to about 9% (w/w), about 0.5% to about 9% (w/w), about 1% to about 9% (w/w), about 2% to about 9% (w/w), about 3% to about 9% (w/w), about 4% to about 9% (w/w), about 5% to about 9% (w/w), about 6% to about 9% (w/w), about 7% to about 9% (w/w), about 8% to about 9% (w/w), about 0% to about 8% (w/w), about 0.5% to about 8% (w/w), about 1% to about 8% (w/w), about 2% to about 8% (w/w), about 3% to about 8% (w/w), about 4% to about 8% (w/w), about 5% to about 8% (w/w), about 6% to about 8% (w/w), about 7% to about 8% (w/w), about 0% to about 7% (w/w), about 0.5% to about 7% (w/w), about 1% to about 7% (w/w), about 2% to about 7% (w/w), about 3% to about 7% (w/w), about 4% to about 7% (w/w), about 5% to about 7% (w/w), about 6% to about 7% (w/w), about 0% to about 6% (w/w), about 0.5% to about 6% (w/w), about 1% to about 6% (w/w), about 2% to about 6% (w/w), about 3% to about 6% (w/w), about 4% to about 6% (w/w), about 5% to about 6% (w/w), about 0% to about 5% (w/w), about 0.5% to about 5% (w/w), about 1% to about 5%

(w/w), about 2% to about 5% (w/w), about 3% to about 5% (w/w), about 4% to about 5% (w/w), about 0% to about 4% (w/w), about 0.5% to about 4% (w/w), about 1% to about 4% (w/w), about 2% to about 4% (w/w), about 3% to about 4% (w/w), about 0% to about 3% (w/w), about 0.5% to about 3% (w/w), about 1% to about 3% (w/w), about 2% to about 3% (w/w), about 0% to about 2% (w/w), about 0.5% to about 2% (w/w), about 1% to about 2% (w/w), about 0% to about 1% (w/w), or about 0.5% to about 1% (w/w). In an embodiment, a slip agent can be about 0.5%, about 1%, about 2%, about 3%, about 4%, about 5%, about 6%, about 7%, about 8%, about 9%, or about 10% (w/w). In an embodiment, the formulation lacks a slip agent.

In an embodiment, a colorant can be about 0% to about 20% (w/w), about 0% to about 15% (w/w), about 0% to about 10% (w/w), about 0% to about 5% (w/w), about 0% to about 4% (w/w), about 0.1% to about 4%, about 0.25% to about 4%, about 0.5% to about 4%, about 0.75% to about 4%, about 1.0% to about 4%, about 1.5% to about 4%, about 2.0% to about 4%, about 2.5% to about 4%, about 3% to about 4%, about 0% to about 3.0%, about 0% to about 2.5%, about 0% to about 2.25%, about 0% to about 2.0%, about 0% to about 1.5%, about 0% to about 1.0%, about 0% to about 0.5%, about 0.1% to about 3.5%, about 0.1% to about 3.0%, about 0.1% to about 2.5%, about 0.1% to about 2.0%, about 0.1% to about 1.5%, about 0.1% to about 1.0%, about 1% to about 5%, about 1% to about 10%, about 1% to about 15%, about 1% to about 20%, or about 0.1% to about 0.5%. In an embodiment, a formulation lacks a colorant.

In an embodiment, the formulation comprises:
50-100 wt % of a primary base resin
0-50 wt % of a secondary resin
0-5 wt % of a chemical blowing agent
0.1-20 wt % of a nucleating agent
0-20 wt % of a colorant
0-10 wt % of a slip agent
In another embodiment, the formulation comprises:
50-100 wt % of a primary base resin
0-50 wt % of a secondary resin
0-2 wt % of a chemical blowing agent
0-20 wt % of a physical nucleating agent
0-20 wt % of a colorant
0-10 wt % of a slip agent
In another embodiment, the formulation comprises:
75-85 wt % of a primary base resin
10-20 wt % of a secondary resin
0-0.1 wt % of a chemical blowing agent
0.1-3 wt % of a nucleating agent
0-2 wt % of a colorant
0-4 wt % of a slip agent
In another embodiment, the formulation comprises:
50-99.65 wt % of the primary base resin
0-50 wt % of the secondary resin
0-10 wt % of the slip agent
0-10 wt % of the colorant
0.35-1.5 wt % of nucleating agent
In another embodiment, the formulation comprises:
50-95 wt % of the primary base resin
0-50 wt % of the secondary resin
0-10 wt % of the slip agent
0-10 wt % of the colorant
0.4-1.2 wt % of nucleating agent
In another embodiment, the formulation comprises:
55-85 wt % of the primary base resin
0-50 wt % of the secondary resin
0-10 wt % of the slip agent
0-10 wt % of the colorant
0.45-1.25 wt % of nucleating agent
In another embodiment, the formulation comprises:
50-99.69 wt % of the primary base resin
0-50 wt % of the secondary resin
0-10 wt % of the slip agent
0-10 wt % of the colorant
0.01-1.5 wt % of the primary nucleating agent
0.3-1.7 wt % of the secondary nucleating agent
In another embodiment, the formulation comprises:
50-95 wt % of the primary base resin
0-50 wt % of the secondary resin
0-10 wt % of the slip agent
0-10 wt % of the colorant
0.02-1.0 wt % of the primary nucleating agent
0.4-1.5 wt % of the secondary nucleating agent
In another embodiment, the formulation comprises:
55-85 wt % of the primary base resin
0-50 wt % of the secondary resin
0-10 wt % of the slip agent
0-10 wt % of the colorant
0.03-0.7 wt % of the primary nucleating agent
0.45-1.25 wt % of the secondary nucleating agent
In another embodiment, the formulation comprises:
78-83 wt % of a primary base resin
14-16 wt % of a secondary resin
0-0.05 wt % of a chemical blowing agent
0.25-2 wt % of a nucleating agent
1-2 wt % of a colorant
1.5-3.5 wt % of a slip agent In the preceding embodiments, the primary base resin may comprise a polypropylene. Suitably, the primary base resin comprises at least one of Borealis WB140 HMS polypropylene homopolymer and Braskem F020HC polypropylene homopolymer. More suitably, the primary base resin is Borealis WB140 HMS polypropylene homopolymer.

In the preceding embodiments, the secondary resin may comprise at least one polypropylene copolymer or polypropylene homopolymer. Suitably, the secondary resin comprises at least one of Braskem F020HC polypropylene homopolymer and PP 527K (available from Sabic). More suitably, the secondary resin is Braskem F020HC polypropylene homopolymer.

In the preceding embodiments, the chemical blowing agent may comprise citric acid, or a citric acid-based material. Suitably the chemical blowing agent is Hydrocerol™ CF-40E (available from Clariant Corporation).

In the preceding embodiments, the nucleating agent may comprise talc, $CaCO_3$, mica and mixtures thereof. Suitably, the nucleating agent is one or more of HT4HP talc (available from Heritage Plastics) and HT6000 Linear Low Density Polyethylene (LLDPE) (available from Heritage Plastics) and Techmer PM PPM 16466 Silica. More suitably, the nucleating agent is HT4HP talc (available from Heritage Plastics) or Techmer PM PPM 16466 Silica. A primary nucleating agent may be defined as a chemical blowing agent or chemical foaming agent, itself comprising a nucleating agent. In a particular embodiment, a primary nucleating agent is Hydrocerol™ CF-40E™ (available from Clariant Corporation). In a particular embodiment, a secondary nucleating agent is selected from HPR-803i fibers (available from Milliken) or talc In the preceding embodiments, the colorant may comprise at least one of Colortech 11933-19 $TiO_2$ PP and Cell Stabilizer. Suitably, the colorant is Colortech 11933-19 $TiO_2$ PP.

In the preceding embodiments, the slip agent may comprise one or more amides of fats or fatty acids, such as erucamide and oleamide. The slip agent may also comprise one or more low molecular weight amides and fluoroelastomers. Suitably, the slip agent is Ampacet 102823 Process Aid PE MB LLDPE.

The method of any of the preceding embodiments may also comprise adding $CO_2$ to the formulation prior to extrusion at a rate of 1-4 lbs/hr. In one example, the $CO_2$ is added at a rate of 2-3 lbs/hr. In another example, the $CO_2$ is added at a rate of 2.2-2.8 lbs/hr. Such practice may also be referred to as adding a physical blowing agent.

In illustrative embodiments, the middle cellular non-aromatic polymeric layer 12M has a density in a range of about 0.01 $g/cm^3$ to about 0.19 $g/cm^3$. In illustrative embodiments, the middle cellular non-aromatic polymeric layer has a density in a range of about 0.05 $g/cm^3$ to about 0.19 $g/cm^3$. In illustrative embodiments, the middle cellular non-aromatic polymeric layer has a density in a range of about 0.1 $g/cm^3$ to about 0.185 $g/cm^3$.

Outer polymeric layer 12O and inner polymeric layer 12I are, for example, made a non-aromatic polymer. Inner polymeric layer 12I is spaced apart from outer polymeric layer 12O so as to locate middle insulative cellular non-aromatic polymeric layer 12M therebetween. Inner polymer layer 12I is located between interior region 14 and middle insulative cellular non-aromatic polymeric layer 12M as shown, for example, in FIG. 2.

In one illustrative example, outer and inner polymeric layers 12O, 12I are made from polypropylene. While inner and outer polymeric layers 12O, 12I may be made from the same material, they may also be made from different materials so as to achieve desired performance characteristics of the container.

Container 10 includes, from top to bottom, a brim 16 and a body 18 as shown in FIG. 1. Brim 16 is appended to a top portion of body 18 and arranged to define a mouth 20 opening into interior region 14 formed in body 18. In one example, container 10 is an insulative drink cup and brim 16 is adapted to mate with a lid which covers and closes mouth 20.

Container 10 is formed using container-manufacturing process 100 as shown, for example in FIGS. 3A-4. Container-manufacturing process 100 is, for example, a multi-layer co-extruded blow molding operation as suggested in FIGS. 3A and 4. Container-manufacturing process 100 includes an inner layer extrusion operation 102, a middle layer extrusion operation 104, an outer layer extrusion operation 106, and a tube forming operation 108 as shown in FIGS. 3A and 4. Inner layer extrusion operation 102 occurs when a first extruder 131 extrudes an inner layer 142 which provides inner polymeric layer 12I. Middle layer extrusion operation 104 occurs when a second extruder 132 extrudes a middle layer 142 which provides middle cellular non-aromatic polymeric layer 12M. Outer layer extrusion operation 106 occurs when a third extruder 133 extrudes an outer layer 143 which provides outer polymeric layer 12O. All three layers 141, 142, 143 are brought together in order during tube forming operation 108 in a die 140 to establish multi-layer tube 12 as shown in FIG. 3A.

While container-manufacturing process 100 shows the extrusion of three layers, any number of inner layers, middle layers, and outer layers may be extruded by any number of extrudes. These various layers may then be combined in the die to establish a multi-layer tube.

Container-manufacturing process 100 further includes an extruding multi-layer tube operation 110, a mold closing operation 112, an air pumping operation 114, a mold opening operation 116, and a vessel removing operation 118 as shown, for example, in FIGS. 3B-4. During extruding multi-layer tube operation 110, extruders 131, 132, 133 continue to extrude associated layers 141, 142, 143 so that multi-layer tube 12 is extruded between two mold halves 134A, 134B included in a mold 134 as shown in FIG. 3A. During mold closing operation 112, mold halves 134A, 134B are brought together to establish a mold cavity 134C formed in mold 134. Next, air is pumped into a portion of multi-layer tube 12 trapped in mold cavity 134C to cause multi-layer tube 12 to expand and take on a shape of mold cavity 134C and establish a vessel 22 including an interior space 24 filled with air. However, in another example vacuum may be applied to the multi-layer tube 12 in mold cavity 134 to take on the shape of mold cavity 134. During mold opening operation 116, mold halves 134A, 134B open and move away from one anther as shown in FIG. 3C. Vessel 22 is removed from mold 134.

In one example, a continuous extrusion process may be used in combination with a rotary blow molding machine. In this example, a continuous multi-layer tube is extruded and a series of molds included in the rotary blow molding machine rotate relative to the multi-layer tube. As molds approach the extruders forming the multi-layer tube, they begin to move from an opened arrangement to a closed arrangement trapping a portion of the multi-layer tube in a mold cavity formed in the mold. As the molds move away from the extruders forming the multi-layer tube, they move from the closed position to an opened position where a vessel is ejected from the mold cavity. One example of a rotary extrusion blow molding machine is available from Wilmington Machinery of Wilmington, N.C.

In another example, a continuous extrusion process may be used in combination with a shuttle blow molding machine. In this example, a first mold on a track moves to an opened position, slides over to receive the multi-layer tube in the mold cavity, and moves to a closed position. The first mold then slides away from the multi-layer tube where air is pumped into the interior space to cause the multi-layer tube to assume the mold shape. When the first mold moves away from the multi-layer tube, a second mold moves to an opened position, slides over to receive the continuously extruded multi-layer tube in a mold cavity of the second mold, and moves to a closed position. The second mold then slides away from the multi-layer tube where air is pumped into the interior space. While the second mold moves away from the multi-layer tube, the first mold moves to the opened position ejecting the vessel to start the process over again. One example of a shuttle blow molding machine is available from Graham Engineering Corporation of York, Pa.

Container-manufacturing process 100 may include an optional step of inserting a label or other item in the mold cavity prior to receiving the multi-layer tube 12 therein. As a result, body 18 may be formed with a printed label or other feature coupled to the side wall 28 during molding. Thus, container-manufacturing process 100 is capable of an-mold labeling operation.

Container-manufacturing process 100 further includes a cutting operation 120 and a forming operation 122 as shown in FIG. 4. During cutting operation 120, a top portion 26 of vessel 22 is cut and separated from vessel 22 to cause body 18 to be established. As shown in FIGS. 5 and 6, body 18 includes a side wall 28 and a floor 30. Floor 30 is appended to a lower portion of side wall 28 and cooperates with side wall 28 to define interior region 14 as shown in FIG. 5. Body 18 may then be accumulated and transported to forming operation 122 where a brim-forming step and a printing step may be performed. During the brim-forming step, brim 16 is formed on body 18 using a brim-forming machine (not shown) where a top portion of body 18 is rolled downwardly toward side wall 28. During the printing step, graphics, words, or other indicia may be printed on outwardly facing surface of outer polymeric layer 12O. Once brim 16 is established on body 18, container 10 is established.

Body 18 is shown, for example, in FIGS. 5 and 6 after cutting operation 120 has been performed on vessel 22. Body 18 includes side wall 28 and floor 30 as shown in FIGS. 5 and 6. An aperture 32 is formed as a result of cutting operation 120. Aperture 32 will become mouth 20 after the brim-forming step has occurred.

Body 218 is formed using container-manufacturing process 300 as shown, for example in FIGS. 7A-8. Container-manufacturing process 300 is, for example, a multi-layer co-extruded blow molding operation as suggested in FIGS. 7A-8. Container-manufacturing operation 300 includes inner layer extrusion operation 102, middle layer extrusion operation 104, outer layer extrusion operation 106, and tube forming operation 108 as shown in FIGS. 3A, 4, 7A, and 8. Inner layer extrusion operation 102 occurs when first extruder 131 extrudes an inner layer 141 which provides inner polymeric layer 12I. Middle layer extrusion operation 104 occurs when second extruder 132 extrudes a middle layer 142 which provides middle insulative cellular non-aromatic polymeric layer 12M. Outer layer extrusion operation 106 occurs when third extruder 133 extrudes an outer layer 143 which provides outer polymeric layer 12O. All three layers 141, 142, 143 are brought together in die 140 during tube forming operation 108 to establish multi-layer tube 12 as shown in FIG. 7A.

Container-manufacturing process 300 further includes extruding multi-layer tube operation 110, mold closing operation 112, air pumping operation 114, mold opening operation 116, and vessel removing operation 118 as shown, for example, in FIGS. 7B-8. During extruding multi-layer tube operation 110, extruders 131, 132, 133 continue to extrude associated layers 141, 142, 143 so that multi-layer tube 12 is extruded between two mold halves 134A, 134B included in mold 134 as shown in FIG. 7A. During mold closing operation 112, mold halves 134A, 134B are brought together to establish mold cavity 134C formed in mold 134. Next, air is pumped into a portion of multi-layer tube 12 trapped in mold cavity 134C to cause multi-layer tube 12 to expand and take on the shape of mold cavity 134C and establish vessel 22 including interior space 24 filled with air. During mold opening operation 116, mold halves 134A, 134B open and move away from one anther as shown in FIG. 7C. Vessel 22 is removed from mold 134.

Container-manufacturing process 300 further includes a cutting operation 320, a floor forming operation 322, a floor coupling operation 324, and a body establishing operation 326 as shown in FIG. 8. During cutting operation 320, a top portion 226 of vessel 22 and a bottom portion 227 of vessel 22 is cut and separated from vessel 22 to cause a side wall 228 to be established as suggested in FIGS. 7C and 7D. During floor forming operation 322, a floor 230 is formed. Floor 230 may be injection molded, thermoformed, or any other suitable alternative. During floor coupling operation 324, floor 230 is coupled to a bottom portion of side wall 228. Body 218 is established during body establishing operation 326 as shown in FIGS. 7D, 9, and 10.

Body 218 includes side wall 228 and floor 230 as shown in FIGS. 9 and 10. Floor 230 is coupled to the lower portion of side wall 228 and cooperates with side wall 228 to define interior region 214 as shown in FIG. 9. In one example, floor 230 is coupled by adhesive to floor 230. In another example, floor 230 is coupled by a heat seal to floor 230. However, any suitable means for coupling floor 230 to side wall 228 may be used.

Body 218 may then be accumulated and transported to forming operation 328 where a brim-forming step and a printing step may be performed. During the brim-forming step, a brim is formed on body 218 using a brim-forming machine (not shown) where a top portion of body 218 is rolled downwardly toward side wall 228. During the printing step, graphics, words, or other indicia may be printed on outwardly facing surface of outer polymeric layer 12O. Once the brim is established on body 218, a container is established.

Another embodiment of a container 410 in accordance with the present disclosure is shown, for example, in FIGS. 11 and 12. Container 410 is made using one of the container-manufacturing processes 100, 300. Container 410 includes a brim 416, a side wall 428, a floor 430 as shown, for example in FIGS. 11 and 12. Container 410 has relatively vertical side wall 428 as compared to container 10 which has an angled side wall 28. In addition, side wall 428 is formed to include a plurality of ribs 434 as shown in FIGS. 11 and 12. Ribs 434 may be used to maximize stack strength of container 410.

Another embodiment of a container 510 in accordance with the present disclosure is shown, for example, in FIGS. 13A and 13E. Container 510 is made from another embodiment of a multi-layer tube that includes an inner polymeric layer 512I, middle insulative cellular non-aromatic polymeric layer 512M, and outer polymeric layer 512O as shown in FIGS. 13C and 13D. Container 510 has, for example, an interior region 514 configured to hold about 750 ml. Container 510 weights about 44 grams.

Inner polymeric layer 512I is made from a polymeric material including high density polyethylene and colorant. Outer polymeric layer 512O is made from a polymeric material including high density polyethylene. Middle insulative cellular non-aromatic polymeric layer 512M is made from an insulative cellular non-aromatic polymeric material that includes high density polyethylene and a talc nucleating agent as suggested in FIG. 13D.

Container 510 includes, from top to bottom, a brim 516 and a body 518 as shown in FIG. 13A. Brim 516 is appended to a top portion of body 518 and arranged to define a mouth 520 opening into interior region 514 formed in body 518. In one example, container 510 is an insulative drink cup and brim 516 is adapted to mate with a lid which covers and closes mouth 520. Body 518 includes a side wall 528 and a floor 530 as shown in FIG. 13B.

In one example, containers 510 were formed from a multi-layer tube. The middle layer used to form middle insulative cellular non-aromatic polymeric material 512M had a density of about 0.83 grams per cubic centimeter. After mating the inner layer with the inner and outer layers and forming container 510, container 510 had a density of about 0.95 grams per cubic centimeter.

In another example, operation of the second extruder 132 was optimized to minimize density of the middle layer. In addition, thicknesses of inner and outer layers were minimized. As a result, inner polymeric layer 512I is about 15% of a total thickness of side wall 528 of container 510. Outer polymeric layer 512O is about 15% of the total thickness of side wall 528 of container 510. Middle insulative cellular non-aromatic polymeric material 512M is about 70% the total thickness of side wall 528 of container 510. Container 510, as a result, has a density of about 0.87 grams per cubic centimeter after optimization.

Inner polymeric layer 512I of container 510 has a weight of about 32 grams. Outer polymeric layer 512O of container 510 has a weight of about 40 grams. Middle insulative cellular non-aromatic polymeric material 512M has a weight of about 35 grams.

The optimized container 510 was tested in an Instron tester to determine top load performance as suggested in FIG. 13E. Table 1 shows the performance of several containers 510 (including middle cellular layer 512M) tested vs. several high density polyethylene containers (excluding middle cellular layer 512M).

TABLE 1

Comparison of Non-Cellular Containers vs. Cellular Containers in top-loading performance (higher collapse force is better and lower mass of container is better)

| Container Type | Mass of Container (grams) | Collapse Force (lbs) |
| --- | --- | --- |
| Non-Cellular | 44.0 | 57 |
| Non-Cellular | 40.0 | 36 |
| Non-Cellular | 35.0 | 26 |
| Cellular | 40.0 | 58 |
| Cellular | 35.0 | 41 |
| Cellular | 32.0 | 32 |

The results of the top-loading testing show that containers 510 withstood higher collapse force even when about 10% lighter than non-cellular containers. As a result, container 510 provides for a more sustainable container as less material is a stronger container is provided that maximizes stack strength.

Another embodiment of a container 610 in accordance with the present disclosure is shown, for example, in FIGS. 14B, 14D, and 14E. Container 610 is made from another embodiment of a multi-layer tube 612 that includes an inner polymeric layer 612I, middle insulative cellular non-aromatic polymeric layer 612M, and outer polymeric layer 612O as shown in FIG. 14C. Container 610 has, for example, an interior region 614.

Container 610 includes, from top to bottom, a neck 616 and a body 618 as shown in FIG. 14B. Neck 616 is appended to a top portion of body 618 and arranged to define a mouth 620 opening into interior region 614 formed in body 618. In one example, container 610 is a shampoo bottle and neck 616 is adapted to mate with a lid which covers and closes mouth 620. Body 618 includes a side wall 628 and a floor 630 as shown in FIG. 14B.

In one example, containers 610 were formed from a multi-layer tube. The middle layer used to form middle insulative cellular non-aromatic polymeric layer 612M had a density of about 0.62 grams per cubic centimeter. After mating the inner layer with the inner and outer layers and forming container 610, container 610 has a density of about 0.88 grams per cubic centimeter as suggested in FIG. 14D. Another embodiment of a container 610A has a density of about 0.81 grams per cubic centimeter as suggested in FIG. 14E.

Container 710 in accordance with the present disclosure is shown in FIG. 15. Container 710 is made from a multi-layer tube including an inner polymeric layer, an outer polymeric layer, and a middle cellular non-aromatic polymeric layer. As shown in FIG. 15, container 710 includes a floor 730, a side wall 728 appended to floor 730 to extend upwardly generally perpendicular to floor 730, and a neck 716 appended to an upper end of side wall 728. Neck 716 defines a mouth 720 arranged to open into an interior region 714 formed between floor 730 and side wall 728.

Container 710 was also subjected to top-load testing as suggested in FIGS. 18 and 20. To begin the top-load testing, an Instron tester is turned on along with a computer coupled to the Instron tester to obtain data and control the tester. Test parameters are then loaded into the computer. The test parameters include a deflection of about 0.200 inches, a speed of about 2 inches per minute, and a minimum load of 45 pounds. After the test parameters are input, a sample container is placed on a platform included in the Instron tester. A test unit included in the Instron tester is then moved to just barely engage the sample container. The test routine is then initiated. As the test unit moves down deforming the sample container, force vs. displacement is measured. Higher forces measured indicate a better performing container.

As shown in FIG. 18 various containers with the same shape but substantially the same mass of about 56 grams were subjected to top-load testing. A control container 800 includes only a solid monolayer of polymeric material having a density of about 0.955 g/cm$^3$. A first sample container 801 includes only a foam monolayer of polymeric material having a density of about 0.51 g/cm$^3$. A second sample container 802 includes only a foam monolayer of polymeric material having a density of about 0.61 g/cm$^3$. A third sample container 803 includes only a foam monolayer of polymeric material having a density of about 0.71 g/cm$^3$. A fourth sample container 804 was made from a multi-layer tube including an inner polymeric layer, an outer polymeric layer, and a middle cellular non-aromatic polymeric layer located therebetween. Fourth sample container 804 had a density of about 0.51 g/cm$^3$. A fifth sample container 805 was made from a multi-layer tube including an inner polymeric layer, an outer polymeric layer, and a middle cellular non-aromatic polymeric layer located therebetween. Fifth sample container 805 had a density of about 0.61 g/cm$^3$. A sixth sample container 806 was made from a multi-layer tube including an inner polymeric layer, an outer polymeric layer, and a middle cellular non-aromatic polymeric layer located therebetween. Sixth sample container 806 had a density of about 0.71 g/cm$^3$. A seventh sample container 807 was made from a multi-layer tube including an inner polymeric layer, an outer polymeric layer, and a middle cellular non-aromatic polymeric layer located therebetween. Seventh sample container 807 had a density of about 0.91 g/cm$^3$.

As shown in FIG. 18, fifth, sixth, and seventh sample containers 805, 806, and 807 all peaked at higher force than control container 800. In addition, sixth sample container 806 had the highest peak force when compared with higher and lower density sample containers 807, 805, 804. The graph shown in FIG. 18 indicates that containers made from the multi-layer tube and having a density less than the density of the control container 800 and higher than about 0.51 g/cm$^3$ have between 5% to about 30% increased compressive strength. In one example, sixth sample 806 container peaked at about 215 pounds while control container 800 peaked at about 170 pounds providing an increase of about 26% in top-load performance. In another example, seventh sample container 807 peaked at about 195 pounds providing an increase of about 15% in top-load performance. In still yet another example, fifth sample container 805 peaked at about 185 pounds providing an increase of about 9% in top-load performance.

As shown in FIG. 20 various containers with the same shape but substantially the same wall thickness of about 0.039 inches were subject to top-load testing. A control container 900 includes only a solid monolayer of polymeric material having a density of about 0.955 g/cm³. A first sample container 901 includes only a foam monolayer of polymeric material having a density of about 0.51 g/cm³. A second sample container 902 includes only a foam monolayer of polymeric material having a density of about 0.61 g/cm³. A third sample container 903 includes only a foam monolayer of polymeric material having a density of about 0.71 g/cm³. A fourth sample container 904 was made from a multi-layer tube including an inner polymeric layer, an outer polymeric layer, and a middle cellular non-aromatic polymeric layer located therebetween. Fourth sample container 904 had a density of about 0.51 g/cm³. A fifth sample container 905 was made from a multi-layer tube including an inner polymeric layer, an outer polymeric layer, and a middle cellular non-aromatic polymeric layer located therebetween. Fifth sample container 905 had a density of about 0.61 g/cm³. A sixth sample container 906 was made from a multi-layer tube including an inner polymeric layer, an outer polymeric layer, and a middle cellular non-aromatic polymeric layer located therebetween. Sixth sample container 906 had a density of about 0.71 g/cm³. A seventh sample container 907 was made from a multi-layer tube including an inner polymeric layer, an outer polymeric layer, and a middle cellular non-aromatic polymeric layer located therebetween. Seventh sample container 907 had a density of about 0.91 g/cm³.

As shown in FIG. 20, fourth fifth, sixth, and seventh sample containers 904, 905, 906, and 907 all had performance between control container 900 and first, second, and third sample containers 901, 902, 903. When wall thickness is maintained and density is varied, higher density containers will be heavier, and thus, provide more material to resist deformation. As a result, the graph of FIG. 20 shows that those container including inner and outer polymeric layers provide substantially increased strength when compared with containers having only the foamed monolayer.

Container 710 was also subjected to side-wall rigidity testing as suggested in FIGS. 19 and 21. To begin the side-wall rigidity testing, a side-wall rigidity tester 750 is turned on as shown in FIGS. 16 and 17. The side-wall rigidity tester 750 includes a Y-bar 752, a T-bar 754, a travel gauge 756, and a force gauge 758 as shown in FIGS. 16 and 17. Y-bar 752 is used to retain a sample container in place during the side-wall rigidity testing. T-bar 754 is coupled to the force gauge 758 and used to deform a side wall of the sample container as force gauge 758 moves toward the sample container. The travel gauge 758 is coupled to the force gauge 758 to move therewith and is configured to measure a distance of displacement that the T-bar 754 deforms the side wall of the container. The force gauge 758 measure force exerted on T-bar 754 by the sample container as the sample container resists movement of the force gauge 758 and T-bar 754 moving toward the sample container.

The sidewall-rigidity testing begins by placing a sample container between T-bar 754 and Y-bar 752. T-bar 754 and gauges 756, 768 are then moved until T-bar 754 contacts the side wall of the sample container. The force gauge 758 and the travel gauge 756 are both zeroed out. Speed of movement of the force gauge 758 and T-bar 754 is set to 100. T-bar 754 and force gauge 758 then engage and deform the side wall of the sample container until the force gauge 758 has moved about 0.25 inches as measured by the travel gauge 756. Force is measured in pounds through movement of the force gauge 758 and the T-bar 754. Higher forces measured indicate a better performing container.

As shown in FIG. 19 various containers with the same shape but substantially the same mass of about 56 grams were subjected to side-wall rigidity testing. Control container 800, monolayer foam containers 801, 802, 803, and multi-layer containers 804, 805, 806, 807 were subjected to side-wall rigidity testing. As shown in FIG. 19, fifth, sixth, and seventh sample containers 805, 806, and 807 all peaked at higher force than control container 800. In addition, sixth sample container 806 had the highest peak force when compared with higher and lower density sample containers 807, 805, 804.

The graph shown in FIG. 19 indicates that containers made from the multi-layer tube and having a density less than the density of the control container 800 and higher than about 0.51 g/cm³ have between 3% to about 30% increased shear strength. In one example, sixth sample 806 container peaked at about 4.7 pounds while control container 800 peaked at about 4.1 pounds providing an increase of about 24% in side-wall rigidity performance. In another example, seventh sample container 807 peaked at about 4.7 pounds providing an increase of about 15% in side-load rigidity performance. In still yet another example, fifth sample container 805 peaked at about 4.2 pounds providing an increase of about 4% in side-wall rigidity performance.

As shown in FIG. 21 various containers with the same shape but substantially the same wall thickness of about 0.039 inches were subject to side-wall rigidity testing. Control container 900, monolayer foam containers 901, 902, 903, and multi-layer containers 904, 905, 906, 907 were subjected to side-wall rigidity testing. As shown in FIG. 21, fourth fifth, sixth, and seventh sample containers 904, 905, 906, and 907 all had performance between control container 900 and first, second, and third sample containers 901, 902, 903. When wall thickness is maintained and density is varied, higher density containers will be heavier, and thus, provide more material to resist deformation. As a result, the graph of FIG. 21 shows that those container including inner and outer polymeric layers provide substantially increased strength when compared with containers having only the foamed monolayer.

A vessel in accordance with present disclosure includes a floor and a sidewall coupled to the floor and arranged to extend upwardly from ground underlying the floor and to cooperate with the floor to define an interior product-storage region therebetween. The floor and the side wall cooperate to form a monolithic element comprising an inner polymeric layer forming a boundary of the interior product-storage region, an outer polymeric layer arranged to lie in spaced-apart relation to the inner polymeric layer to define a core chamber therebetween, and a middle cellular non-aromatic polymeric material located in the core chamber to lie between the outer polymeric layer and the inner polymeric layer. The inner polymeric layer, the outer polymeric layer, and a middle cellular non-aromatic polymeric material cooperate to provide means for maximizing a compressive strength of the vessel as tested by top-load testing and a shear strength of the vessel as tested by side-wall rigidity testing while minimizing a weight of the vessel.

The compressive strength and the shear strength of the vessel may be related to the physical dimensions of the container. The physical dimensions of the container allow for the calculation of a moment area of Inertia for the container as suggested in FIG. 22. The moment of area of inertia of an object about a given axis describes how difficult it is to change an angular momentum of the object about that axis. The moment area of inertia also describes an amount of mass included in an object and how far each bit of mass is from the axis. The farther the object's mass is from the axis, the more rotational inertia the object has. As a result, more force is required to change the objects rotation rate.

Thus, the compressive strength and the shear strength of the vessel are proportional to the moment area of inertia. The moment area of inertia relative to each axis is defined by the equations below:

$$I_x = \frac{\pi}{4}(r_o^4 - r_i^4)$$

$$I_y = \frac{\pi}{4}(r_o^4 - r_i^4)$$

$$I_z = \frac{\pi}{2}(r_o^4 - r_i^4)$$

The relationship between the moment area of inertia and the vessel and the compressive and shear strengths may be referred to as the I-beam effect.

In an illustrative example, a vessel 1010 was sectioned along the X-Y plane as shown in FIG. 22. Vessel 1010 was formed from a multi-layer tube including an inner polymeric layer 1012I, an outer polymeric layer 1012O, and a middle cellular non-aromatic polymeric layer 1012M as shown in FIG. 22. An outer surface 1014 of outer polymeric layer 1012O provides the value $r_o$ used in the equations above. An inner surface 1016 provided by inner polymeric layer 1012I provides the value $r_i$ used in the equations above.

The following numbered clauses include embodiments that are contemplated and non-limiting:

Clause 1. A vessel comprising
a floor and
a side wall coupled to the floor and arranged to extend upwardly from ground underlying the floor and to cooperate with the floor to define an interior product-storage region therebetween,
wherein the floor and the side wall cooperate to form a monolithic element comprising an inner polymeric layer forming a boundary of the interior product-storage region, an outer polymeric layer arranged to lie in spaced-apart relation to the inner polymeric layer to define a core chamber therebetween, and a middle cellular non-aromatic polymeric material located in the core chamber to lie between the outer polymeric layer and the inner polymeric layer, and
wherein the middle cellular non-aromatic polymeric material has a density in a range of about 0.01 g/cm³ to about 0.19 g/cm³.

Clause 2. A vessel comprising
a floor and
a side wall coupled to the floor and arranged to extend upwardly from ground underlying the floor and to cooperate with the floor to define an interior product-storage region therebetween,
wherein the floor and the side wall cooperate to form a monolithic element comprising an inner polymeric layer forming a boundary of the interior product-storage region, an outer polymeric layer arranged to lie in spaced-apart relation to the inner polymeric layer to define a core chamber therebetween, and a middle cellular non-aromatic polymeric material located in the core chamber to lie between the outer polymeric layer and the inner polymeric layer, and
wherein the inner polymeric layer, the outer polymeric layer, and a middle cellular non-aromatic polymeric material cooperate to provide means for maximizing a compressive strength of the vessel as tested by top-load testing and a shear strength of the vessel as tested by side-wall rigidity testing while minimizing a weight of the vessel.

Clause 3. A vessel comprising
a floor and
a side wall coupled to the floor and arranged to extend upwardly from ground underlying the floor and to cooperate with the floor to define an interior product-storage region therebetween,
wherein the floor and the side wall cooperate to form a monolithic element comprising an inner polymeric layer forming a boundary of the interior product-storage region, an outer polymeric layer arranged to lie in spaced-apart relation to the inner polymeric layer to define a core chamber therebetween, and a middle cellular polymeric material located in the core chamber to lie between the outer polymeric layer and the inner polymeric layer, and
wherein the inner polymeric layer, the outer polymeric layer, and a middle cellular non-aromatic polymeric material cooperate to maximize resistance to a collapse force while minimizing a weight of the vessel.

Clause 4. The vessel of any preceding clause, wherein the middle cellular non-aromatic polymeric material comprises polypropylene.

Clause 5. The vessel of any preceding clause, wherein the density of the middle cellular non-aromatic polymeric material is in a range of about 0.1 g/cm³ to about 0.185 g/cm³.

Clause 6. The vessel of any preceding clause, wherein each of the inner polymeric layer, the outer polymeric layer comprise polypropylene.

Clause 7. The vessel of any preceding clause, wherein each of the inner polymeric layer, the outer polymeric layer comprise polypropylene.

Clause 8. The vessel of any preceding clause, wherein the middle cellular non-aromatic polymeric material comprises high-density polyethylene.

Clause 9. The vessel of any preceding clause, wherein the density of the middle cellular non-aromatic polymeric material is in a range of about 0.1 g/cm³ to about 0.185 g/cm³.

Clause 10. The vessel of any preceding clause, wherein each of the inner polymeric layer, the outer polymeric layer comprise polypropylene.

Clause 11. The vessel of any preceding clause, wherein the density of the middle cellular non-aromatic polymeric material is in a range of about 0.1 g/cm³ to about 0.185 g/cm³.

Clause 12. The vessel of any preceding clause, wherein each of the inner polymeric layer, the outer polymeric layer, and the middle cellular non-aromatic polymeric material comprises polypropylene.

Clause 13. The vessel of any preceding clause, further comprising a brim coupled to an upper portion of the side wall and formed to include a mouth opening into the interior product-storage region.

Clause 14. The vessel of any preceding clause, wherein the brim is coupled to each of the inner polymeric layer and the outer polymeric layer to close an annular opening into a portion of the core chamber formed in the side wall.

Clause 15. The vessel of any preceding clause, wherein the middle cellular non-aromatic polymeric material is the only material located in the core chamber.

Clause 16. The vessel of any preceding clause, wherein the middle cellular non-aromatic polymeric material is arranged to fill the core chamber completely.

Clause 17. The vessel of any preceding clause, wherein the middle cellular non-aromatic polymeric material comprises polypropylene.

Clause 18. The vessel of any preceding clause, wherein the density of the middle cellular non-aromatic polymeric material is in a range of about 0.1 g/cm$^3$ to about 0.185 g/cm$^3$.

Clause 19. The vessel of any preceding clause, wherein each of the inner polymeric layer, the outer polymeric layer comprise polypropylene.

Clause 20. The vessel of any preceding clause, wherein the middle cellular non-aromatic polymeric material comprises polypropylene.

Clause 21. The vessel of any preceding clause, wherein the density of the middle cellular non-aromatic polymeric material is in a range of about 0.1 g/cm$^3$ to about 0.185 g/cm$^3$.

Clause 22. The vessel of any preceding clause, wherein the vessel has an average density in a density range of about 0.51 g/cm$^3$ to about 0.91 g/cm$^3$.

Clause 23. The vessel of any preceding clause, wherein the compression strength of the vessel is greater than a compression strength of a control vessel having a mass about the same as a mass of the vessel and a shape about the same as a shape of the vessel.

Clause 24. The vessel of any preceding clause, wherein the compression strength of the vessel is about 5% to about 30% greater than the compression strength of the control vessel.

Clause 25. The vessel of any preceding clause, wherein the shear strength of the vessel is greater than a shear strength of a control vessel having a mass about the same as a mass of the vessel and a shape about the same as a shape of the vessel.

Clause 26. The vessel of any preceding clause, wherein the compression strength of the vessel is about 3% to about 30% greater the compression strength of the control vessel.

Clause 27. The vessel of any preceding clause, wherein the average density is about 0.91 g/cm$^3$.

Clause 28. The vessel of any preceding clause, wherein the compression strength of the vessel is about 9% greater than a compression strength of a control vessel having a mass about the same as a mass of the vessel a shape about the same as a shape of the vessel.

Clause 29. The vessel of any preceding clause, wherein the shear strength of the vessel is about 4% greater than a shear strength of a control vessel having a mass about the same as a mass of the vessel and a shape about the same as a shape of the vessel.

Clause 30. The vessel of any preceding clause, wherein the density range is about 0.6 g/cm$^3$ to about 0.8 g/cm$^3$.

Clause 31. The vessel of any preceding clause, wherein the average density is about 0.61 g/cm$^3$.

Clause 32. The vessel of any preceding clause, wherein the compression strength of the vessel is about 15% greater than a compression strength of a control vessel having a mass about the same as a mass of the vessel a shape about the same as a shape of the vessel.

Clause 33. The vessel of any preceding clause, wherein the shear strength of the vessel is about 15% greater than a shear strength of a control vessel having a mass about the same as a mass of the vessel and a shape about the same as a shape of the vessel.

Clause 34. The vessel of any preceding clause, wherein the average density is about 0.71 g/cm$^3$.

Clause 35. The vessel of any preceding clause, wherein the compression strength of the vessel is about 26% greater than a compression strength of a control vessel having a mass about the same as a mass of the vessel and a shape about the same as a shape of the vessel.

Clause 36. The vessel of any preceding clause, wherein the shear strength of the vessel is about 24% greater than a shear strength of a control vessel having a mass about the same as a mass of the vessel and a shape about the same as a shape of the vessel.

Clause 37. The vessel of any preceding clause, wherein the shear strength of the vessel is about 24% greater than a shear strength of a control vessel having a mass about the same as a mass of the vessel and a shape about the same as a shape of the vessel.

Clause 38. The vessel of any preceding clause, wherein the vessel has a mass of about 56 grams.

Clause 39. The vessel of any preceding clause, wherein the density of the middle cellular polymeric material is in a range of about 0.1 g/cm$^3$ to about 0.185 g/cm$^3$.

Clause 40. The vessel of any preceding clause, wherein the collapse force required to collapse the vessel is greater than a collapse force required to collapse a non-cellular vessel having a shape about the same as a shape of the vessel.

Clause 41. The vessel of any preceding clause, wherein a mass of the vessel is about equal to a mass of the non-cellular vessel.

Clause 42. The vessel of any preceding clause, wherein the collapse force required to collapse the vessel is about 55% to about 65% greater than the collapse force required to collapse the non-cellular vessel.

Clause 43. The vessel of any preceding clause, wherein the collapse force required to collapse the vessel is about 58% greater than the collapse force required to collapse the non-cellular vessel.

Clause 44. The vessel of any preceding clause, wherein the mass is about 35 grams.

Clause 45. The vessel of any preceding clause, wherein the collapse force required to collapse the vessel is about 61% greater than the collapse force required to collapse the non-cellular vessel.

Clause 46. The vessel of any preceding clause, wherein the mass is about 40 grams.

Clause 47. The vessel of any preceding clause, wherein a mass of the vessel is less than a mass of the non-cellular vessel.

Clause 48. The vessel of any preceding clause, wherein the collapse force required to collapse the vessel is about 1% to about 25% greater than a collapse force required to collapse the non-cellular vessel.

Clause 49. The vessel of any preceding clause, wherein a mass of the vessel is about 32 grams and a mass of the non-cellular vessel is about 35 grams.

Clause 50. The vessel of any preceding clause, wherein the collapse force required to collapse the vessel is about 23% greater than the collapse force required to collapse the non-cellular vessel.

Clause 51. The vessel of any preceding clause, wherein a mass of the vessel is about 35 grams and a mass of the non-cellular vessel is about 40 grams.

Clause 52. The vessel of any preceding clause, wherein the collapse force required to collapse the vessel is about 14% greater than the collapse force required to collapse the non-cellular vessel.

Clause 53. The vessel of any preceding clause, wherein a mass of the vessel is about 40 grams and a mass of the non-cellular vessel is about 44 grams.

Clause 54. The vessel of any preceding clause, wherein the collapse force required to collapse the vessel is about 2% greater than the collapse force required to collapse the non-cellular vessel.

Clause 55. The vessel of any preceding clause, wherein a mass of the vessel is about 5% to about 15% smaller than a mass of the non-cellular vessel is about 35 grams.

Clause 56. The vessel of any preceding clause, wherein the collapse force required to collapse the vessel is about 1% to about 25% greater than a collapse force required to collapse the non-cellular vessel.

Clause 57. The vessel of any preceding clause, wherein the middle cellular polymeric material comprises high density polyethylene.

Clause 58. The vessel of any preceding clause, wherein the middle cellular polymeric material is one of linear low density polyethylene, low density polyethylene, an ethylene copolymer, copolymer polypropylene, polypropylene, polystyrene, nylon, polycarbonate, polyester, copolyester, poly phenylene sulfide, poly phenylene oxide, a random copolymer, a block copolymer, an impact copolymer, homopolymer polypropylene, polylactic acid, polyethylene terephthalate, crystallizable polyethylene terephthalate, styrene acrilynitrile, and combinations thereof.

Clause 59. The vessel of any preceding clause, wherein the middle cellular polymeric material is linear low density polyethylene.

Clause 60. The vessel of any preceding clause, wherein the middle cellular polymeric material is low density polyethylene.

Clause 61. The vessel of any preceding clause, wherein the middle cellular polymeric material is an ethylene copolymer.

Clause 62. The vessel of any preceding clause, wherein the ethylene copolymer is TOPAS®.

Clause 63. The vessel of any preceding clause, wherein the middle cellular polymeric material is copolymer polypropylene.

Clause 64. The vessel of any preceding clause, wherein the middle cellular polymeric material is polypropylene.

Clause 65. The vessel of any preceding clause, wherein the middle cellular polymeric material is polystyrene.

Clause 66. The vessel of any preceding clause, wherein the middle cellular polymeric material is nylon.

Clause 67. The vessel of any preceding clause, wherein the nylon is nylon 6/6.

Clause 68. The vessel of any preceding clause, wherein the nylon is nylon 6.

Clause 69. The vessel of any preceding clause, wherein the middle cellular polymeric material is polycarbonate.

Clause 70. The vessel of any preceding clause, wherein the middle cellular polymeric material is polyester.

Clause 71. The vessel of any preceding clause, wherein the middle cellular polymeric material is copolyester.

Clause 72. The vessel of any preceding clause, wherein the middle cellular polymeric material is poly phenylene sulfide.

Clause 73. The vessel of any preceding clause, wherein the middle cellular polymeric material is poly phenylene oxide.

Clause 74. The vessel of any preceding clause, wherein the middle cellular polymeric material is a random copolymer.

Clause 75. The vessel of any preceding clause, wherein the middle cellular polymeric material is a block copolymer.

Clause 76. The vessel of any preceding clause, wherein the middle cellular polymeric material is an impact copolymer.

Clause 77. The vessel of any preceding clause, wherein the middle cellular polymeric material is homopolymer polypropylene.

Clause 78. The vessel of any preceding clause, wherein the middle cellular polymeric material is polylactic acid.

Clause 79. The vessel of any preceding clause, wherein the middle cellular polymeric material is polyethylene terephthalate.

Clause 80. The vessel of any preceding clause, wherein the polyethylene terephthalate is crystallizable polyethylene terephthalate.

Clause 81. The vessel of any preceding clause, wherein the middle cellular polymeric material is and styrene acrilynitrile.

Clause 82. The vessel of any preceding clause, wherein the middle cellular polymeric material is poly methyl methacrylate.

Clause 83. The vessel of any preceding clause, wherein the middle cellular polymeric material is polyvinyl chloride.

Clause 84. The vessel of any preceding clause, wherein the middle cellular polymeric material is acrylonitrile butadiene styrene.

Clause 85. The vessel of any preceding clause, wherein the middle cellular polymeric material is polyacrylonitrile.

Clause 86. The vessel of any preceding clause, wherein the middle cellular polymeric material is polyamide.

The invention claimed is:

1. A vessel comprising
a floor and
a side wall coupled to the floor and arranged to extend upwardly from ground underlying the floor and to cooperate with the floor to define an interior product-storage region therebetween,
wherein the side wall comprises an outer polymeric layer having an inner surface arranged to face the interior product-storage region and an outer surface arranged to face away from interior product-storage region and a cellular non-aromatic polymeric material layer having an inner surface arranged to face toward the product-storage region and an outer surface arranged to face away from the product-storage region and the outer surface of the cellular non-aromatic polymeric material is in direct engagement with the inner surface of the outer polymeric layer.

2. The vessel of claim 1, wherein the cellular polymeric material layer comprises polylactic acid.

3. The vessel of claim 1, wherein the cellular non-aromatic polymeric material layer comprises high-density polyethylene.

4. The vessel of claim 3, wherein the density of the cellular non-aromatic polymeric material is in a range of about 0.1 g/cm$^3$ to about 0.185 g/cm$^3$.

5. The vessel of claim 4, wherein the vessel has an average density in a density range of about 0.5 g/cm$^3$ to about 0.9 g/cm$^3$.

6. The vessel of claim 5, wherein the outer polymeric layer comprises high-density polyethylene.

7. The vessel of claim 1, wherein the cellular non-aromatic polymeric material layer comprises polypropylene.

8. The vessel of claim 7, wherein the density of the middle cellular non-aromatic polymeric material is in a range of about 0.1 g/cm$^3$ to about 0.19 g/cm$^3$.

9. The vessel of claim 8, wherein the outer layer is extruded onto the cellular non-aromatic polymeric material layer.

10. The vessel of claim 9, wherein the side wall further comprises a second layer coupled to the outer layer to locate the outer layer between the cellular non-aromatic polymeric material layer and the second layer.

11. The vessel of claim 1, wherein the cellular non-aromatic polymeric material layer comprises polyethylene.

12. The vessel of claim 11, wherein the vessel has an average density in a density range of about 0.5 g/cm$^3$ to about 0.9 g/cm$^3$.

13. The vessel of claim 12, wherein each of the outer polymeric layer and cellular non-aromatic polymeric material layer comprises polyethylene.

14. The vessel of claim 13, wherein the cellular non-aromatic polymeric material layer comprises low density polyethylene.

15. The vessel of claim 13, wherein each of the outer polymeric layer and the cellular non-aromatic polymeric material layer comprises low density polyethylene.

16. The vessel of claim 1, wherein the outer polymeric layer is made from a material and the cellular polymeric material layer is made from a different material.

17. The vessel of claim 16, wherein the side wall further comprises an inner layer coupled to the cellular non-aromatic polymeric material layer to locate the cellular non-aromatic polymeric material layer between the inner layer and the outer layer.

18. The vessel of claim 17, where the inner polymeric layer is made from the material of the outer polymeric material.

19. The vessel of claim 17, where the inner polymeric layer is made from a material different from the material of the outer polymeric layer.

20. The vessel of claim 19, wherein the vessel has an average density in a density range of about 0.5 g/cm$^3$ to about 0.9 g/cm$^3$.

\* \* \* \* \*